United States Patent
Shimpo et al.

(10) Patent No.: US 10,179,743 B2
(45) Date of Patent: Jan. 15, 2019

(54) DEVICE AND METHOD FOR CONTROLLING CHEMICAL INJECTION INTO BOILER

(71) Applicant: KURITA WATER INDUSTRIES LTD., Tokyo (JP)

(72) Inventors: Chikako Shimpo, Tokyo (JP); Yukimasa Shimura, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 0 days.

(21) Appl. No.: 15/115,463

(22) PCT Filed: Feb. 23, 2015

(86) PCT No.: PCT/JP2015/055019
§ 371 (c)(1),
(2) Date: Jul. 29, 2016

(87) PCT Pub. No.: WO2015/129618
PCT Pub. Date: Sep. 3, 2015

(65) Prior Publication Data
US 2017/0008784 A1    Jan. 12, 2017

(30) Foreign Application Priority Data

Feb. 28, 2014 (JP) .................... 2014-038865
May 27, 2014 (JP) .................... 2014-109277

(51) Int. Cl.
*C02F 1/68* (2006.01)
*F22B 37/02* (2006.01)
*C02F 1/00* (2006.01)

(52) U.S. Cl.
CPC .............. *C02F 1/686* (2013.01); *C02F 1/008* (2013.01); *F22B 37/025* (2013.01);
(Continued)

(58) Field of Classification Search
CPC .. C02F 1/686; C02F 1/008; C02F 1/66; C02F 2209/02; C02F 2209/006; C02F 2209/005;
(Continued)

(56) References Cited

U.S. PATENT DOCUMENTS 4,966,127 A * 10/1990 Martinez, Jr. ........... F24D 12/02
                                                          122/13.3
5,152,252 A * 10/1992 Bolton .................... C02F 1/686
                                                          122/401

(Continued)

FOREIGN PATENT DOCUMENTS

DE    102008023263 A1    11/2009
EP       2123865 A2      11/2009
(Continued)

OTHER PUBLICATIONS

PCT/ISA/210, "International Search Report for International Application No. PCT/JP2015/055019".

(Continued)

*Primary Examiner* — Claire A Norris
*Assistant Examiner* — Julia L. Wun
(74) *Attorney, Agent, or Firm* — Manabu Kanesaka

(57) ABSTRACT

A device for controlling injection of chemical into a boiler and a chemical injection method can control an injection amount such that a chemical concentration is obtained as per a target even in a boiler feed-water facility where a flow rate of feed-water varies to a large extent in a short period. The device controls an amount discharged by a chemical injection pump in proportion to a flow rate measured by a flowmeter. An average chemical concentration in a feed-water is calculated from an amount of feed-water per predetermined period obtained by the flowmeter and a reduction in the amount of chemical in a tank per predetermined (Continued)

period obtained by a sensor. The chemical injection pump is controlled on the basis of the calculated average chemical concentration and a preset target chemical concentration of the feed-water so that the average chemical concentration is within the target chemical concentration range.

2 Claims, 10 Drawing Sheets

(52) U.S. Cl.
CPC .. *C02F 2209/005* (2013.01); *C02F 2209/006* (2013.01); *C02F 2209/02* (2013.01); *C02F 2209/05* (2013.01); *C02F 2209/40* (2013.01)

(58) Field of Classification Search
CPC .............. C02F 2209/40; C02F 2209/05; C02F 2209/001; C02F 2209/003; C02F 2209/44; C02F 2303/08; C02F 5/00; C02F 5/08; C02F 5/10; F22B 37/025; C23F 15/00
USPC ....... 210/739, 742, 746, 696, 701, 749, 758; 137/2, 9, 187, 88; 122/1, 1 B, 1 R
See application file for complete search history.

(56) References Cited

U.S. PATENT DOCUMENTS

| | | | | |
|---|---|---|---|---|
| 6,148,839 | A * | 11/2000 | Gonske | G05D 11/132 137/101.19 |
| 6,280,635 | B1 * | 8/2001 | Moriarty | C02F 1/008 137/3 |
| 6,344,134 | B1 * | 2/2002 | Yamada | G01N 27/417 204/425 |
| 7,377,685 | B2 * | 5/2008 | Breithaupt | B01F 3/08 366/152.2 |
| 2012/0234756 | A1 | 9/2012 | Hicks et al. | |
| 2013/0220902 | A1 * | 8/2013 | Lee | G05B 11/42 210/96.1 |
| 2013/0233796 | A1 * | 9/2013 | Rao | C02F 1/008 210/639 |
| 2015/0075629 | A1 * | 3/2015 | Davis | F22B 37/02 137/2 |

FOREIGN PATENT DOCUMENTS

| | | | |
|---|---|---|---|
| JP | S52-41805 | B2 | 10/1977 |
| JP | 04297704 | A * | 10/1992 |
| JP | 06-210270 | A | 8/1994 |
| JP | 09-243014 | A | 9/1997 |
| JP | 10-082503 | A | 3/1998 |
| JP | 2002-349805 | A | 12/2002 |
| JP | 2007-209864 | A | 8/2007 |
| JP | 2009-139047 | A | 6/2009 |
| JP | 2009-162463 | A | 7/2009 |
| JP | 2009-228991 | A | 10/2009 |
| JP | 4390473 | B2 | 12/2009 |
| JP | 2010-159965 | A | 7/2010 |
| JP | 2011-122736 | A | 6/2011 |
| JP | 2013-103181 | A | 5/2013 |
| JP | 2013-142505 | A | 7/2013 |

OTHER PUBLICATIONS

Japanese Office Action of JP Application No. 2014-038865 dated May 19, 2015.
Europe Patent Office, "Search Report for European Patent Application No. 15754856.1," dated Mar. 1, 2018.

* cited by examiner

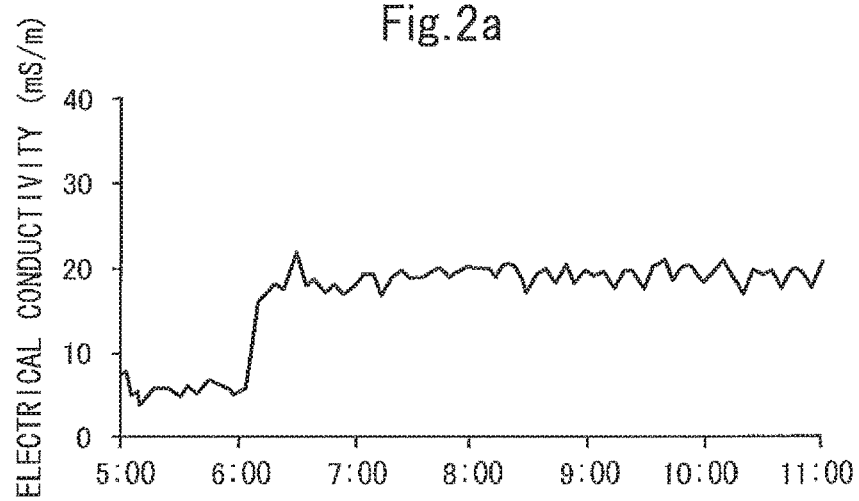
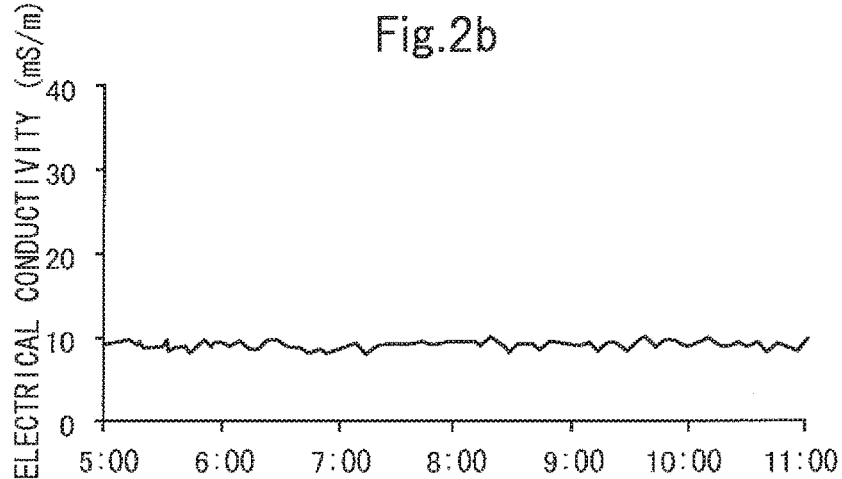
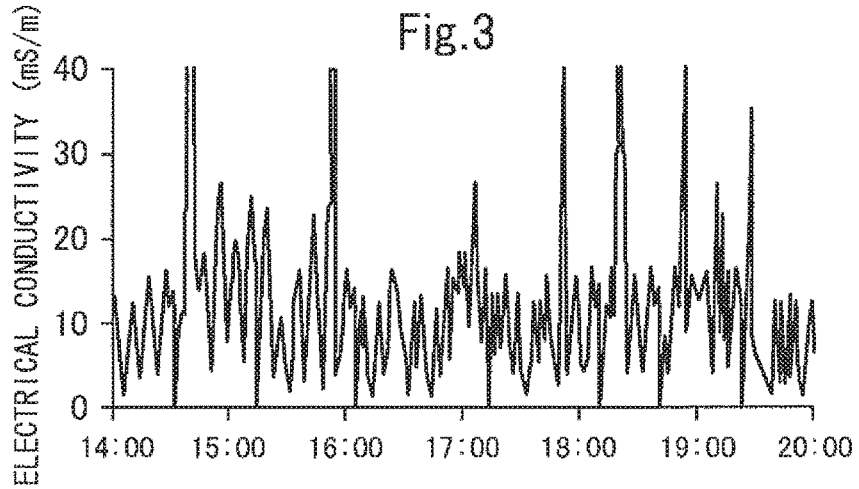

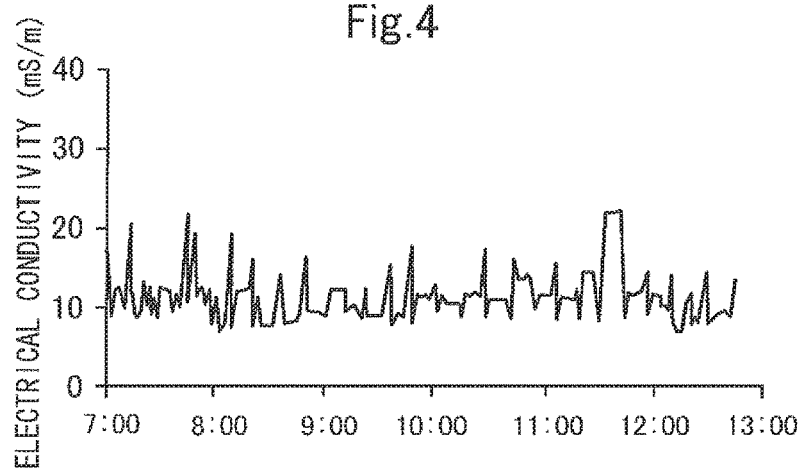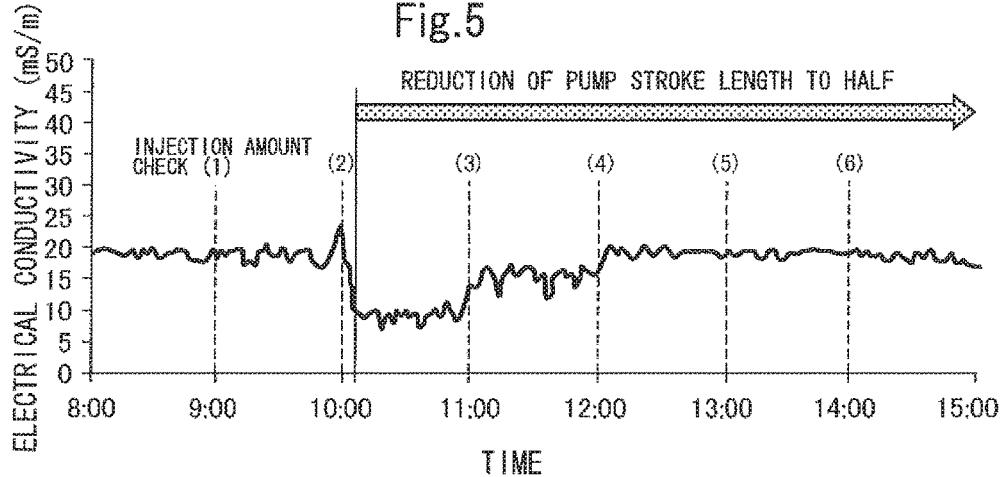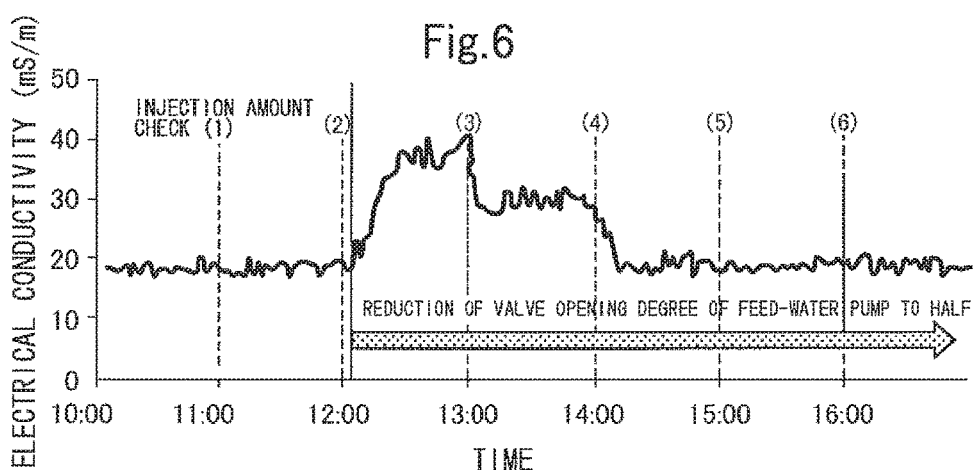

DEVICE AND METHOD FOR CONTROLLING CHEMICAL INJECTION INTO BOILER

FIELD OF INVENTION

The present invention relates to a device and a method for controlling chemical injection into a boiler, and more particularly to a chemical injection control device and method, which are suitable to inject a chemical liquid into a feed-water line provided with a plurality of small once-through boilers.

BACKGROUND OF INVENTION

A feed-water pump for a small once-through boiler is usually controlled to start an operation when a boiler water level reduces down to a setting lower limit value or below, and to stop the operation when the boiler water level reaches a setting upper limit value. Accordingly, the feed-water pump irregularly operates and causes variations in a flow rate of feed-water depending on a combustion state of the boiler. In the case where a plurality of small once-through boilers are installed and operated, feed-water pumps for the individual boilers irregularly operate and cause variations in flow rates of feed-water. Therefore, a flow rate of the feed-water in a feed-water main pipe varies to a large extent.

Injection of a chemical liquid into the small once-through boiler is generally controlled in a manner using a microcomputer, an ON/OFF signal from the feed-water pump, or a pulse signal or an analog signal from a flowmeter.

The control using a microcomputer is executed by assuming that feed-water has been supplied to the boiler in an amount depending on a combustion state and a combustion time of the boiler, and by determining an operation time of a chemical injection pump corresponding to the amount of the supplied feed-water. In the microcomputer control, the chemical injection pump is not always in conjunction with the operation of the feed-water pump. In some cases, the chemical injection pump is operated when the feed-water pump is not operated, and conversely the chemical injection pump is not operated even when the feed-water pump is operated. Hence a chemical concentration in the feed-water tends to greatly vary in the microcomputer control.

In the manner of controlling the chemical injection pump in accordance with an ON/OFF signal from the feed-water pump, variations of the chemical concentration in the feed-water are smaller than those in the case of the microcomputer control, because the chemical injection pump is operated when the chemical injection pump is under the operation. However, since a flow rate of feed-water is slightly reduced just after startup of a feed-water pump and at the end of the started operation, an injection amount of a chemical (dosage) is relatively large just after the startup and at the end of the started operation.

In the manner of controlling the chemical injection pump in accordance with a pulse signal or an analog signal from a feed-water flowmeter, the chemical concentration in the feed-water can be held close to a target concentration, because the number of strokes per minute of the chemical injection pump is determined in proportion to the flow rate of the feed-water. In the case of supplying the feed-water by merely controlling the chemical injection pump in accordance with the pulse signal or the analog signal from the feed-water flowmeter, an error between an actual injection amount and a target injection amount increases when the performance of the feed-water pump or the chemical injection pump degrades. If the chemical concentration in the feed-water is lower than the target concentration, there arise problems, for example, that the effect of an anticorrosive becomes insufficient in equipment (such as a feed-water pipe and an economizer) prior to reaching a boiler drum, and that the deoxidization effect of a deoxidizer reduces. Conversely, if chemicals are added in excess, it is uneconomical.

Japanese Patent 4390473 (Japanese Patent Publication 2004-321860A) proposes a correction method of detecting an injection amount by a flowmeter installed in a chemical injection pipe, and calculating a feedback value on the basis of a detected value in real time. However, the proposed method is to feedback-control a pumping rate of the chemical injection pump from a measured value of a flow rate when change of the flow rate is small. Hence the proposed method has a problem that, in a facility causing large variations in the flow rate as in a feed-water facility equipped with a plurality of small once-through boilers, a control signal varies to a large extent depending on the timing of detection by the flowmeter, time lags in calculation and control, etc., and a difficulty occurs in keeping the injection amount appropriate.

Usually, one or two types of multifunction boiler cleaners in combination of plural kinds of chemicals having water treatment effects are injected to a low-pressure boiler. In some cases, however, a particular component becomes deficient or excessive for the reason that the quality or the temperature of feed-water varies due to variations in drain recovery or quality of raw water, and that balance among the required amounts of an alkali aid, a deoxidizer, an anticorrosive, a dispersant, etc. varies.

An anticorrosive component is controlled by a method on the basis of the concentration of the anticorrosive component added to the feed-water, or a method on the basis of the concentration of the anticorrosive component in a boiler water. In the former method, the chemical (anticorrosive component) is injected to keep constant the chemical concentration in the feed-water regardless of the drain recovery. When the latter method is applied to a boiler in which a degree of concentration is controlled by discharging blow water upon the electrical conductivity of the boiler water reaching a setting upper limit value, and by stopping the discharge of the blow water upon reaching a setting lower limit value, the following problem arises. Because the concentration degree varies when the electrical conductivity of the feed-water varies due to variations in the drain recovery rate or the quality of the feed-water, the chemical concentration in the boiler water cannot be controlled at a constant level even when the chemical injection is performed in proportion to the flow rate of the feed-water.

It has been difficult to keep the boiler water treatment optimum due to the complicated actions of the above-described problems, i.e., the problem that the injected chemical concentration with respect to the feed-water cannot be maintained, and that the required injected chemical concentration varies depending on operating conditions of the boiler. If the chemical concentration is lower than a target value, the water treatment effect becomes insufficient in some cases. For example, the effect of the anticorrosive is insufficient and corrosion progresses. The deoxidization effect of the deoxidizer reduces, and a large amount of oxygen transits into vapor, thus generating corrosion in a condensate pipe. On the other hand, if the chemicals are added in excess, the electrical conductivity of the boiler water excessively increases to such an extent as causing carryover, or the chemical cost rises.

Methods for controlling a target injection amount, i.e., a discharge rate of a chemical injection pump, depending on variations in drain recovery or quality of raw water have been proposed as below. Japanese Patent Publication 2010-159965A discloses a method of determining an operation time of a chemical injection pump for a pH adjuster depending on a concentration of carbonic acid in feed-water. Japanese Patent Publication H10-82503A discloses a method of determining operation time of a chemical injection pump depending on a temperature of feed-water. However, any of those methods is not adaptable for change of a discharge rate due to, e.g., the above-described reduction in the performance of a chemical injection pump or a feed-water pump.

When a chemical is injected to feed-water such that a concentration thereof in the feed-water is constant, a period-average injected chemical concentration can be manually checked by recording a chemical reduction amount and an integrated value of the feed-water flow rate. However, when feed conditions of a chemical injection pump are changed depending on variations in drain recovery or a quality of raw water, a reduction amount of a chemical and an integrated value of a feed-water flow rate have to be checked each time the feed conditions are changed. It is not realistic from the practical point of view to change the feed conditions of the chemical injection pump while recognizing usage situations of vapor in a process, and variations in the drain recovery or the quality of the raw water at all times, which are affected by weather, air temperature, etc. Thus, whether the injected chemical concentration is controlled as per a target has been infeasible to check.

Patent Literature 1: Japanese Patent 4390473
Patent Literature 2: Japanese Patent Publication 2010-159965A
Patent Literature 3: Japanese Patent Publication H10-82503A

SUMMARY OF INVENTION

An object of the present invention is to provide a device for controlling chemical injection into a boiler and a chemical injection method, which can control an injection amount such that a chemical concentration is obtained as per a target even in a boiler feed-water facility where a flow rate of feed-water varies to a large extent in a short period.

A first invention provides a device for controlling chemical injection into a boiler. The device includes a feed-water line for supplying feed-water from a feed-water tank to a boiler through a feed-water pipe provided with a feed-water pump; a feed-water flow rate measuring device for measuring a flow rate of the feed-water flowing through the feed-water pipe; a chemical injection pump for injecting a solution containing one or more chemicals for boiler water treatment (the solution being called a "chemical liquid" hereinafter) into the feed-water line, the chemical liquid being stored in a chemical tank; a chemical liquid amount measuring device for measuring an amount of the chemical liquid stored in the chemical tank; and a controller for controlling a discharge rate of the chemical injection pump in proportion to the flow rate measured by the feed-water flow rate measuring device. An average chemical concentration in the feed-water is calculated from a feed-water volume per a predetermined period and a reduction amount of the chemical liquid in the tank per the predetermined period. The feed-water volume per the predetermined period is determined by the feed-water flow rate measuring device. The reduction amount of the chemical liquid in the tank is determined by the chemical liquid amount measuring device. The controller controls the chemical injection pump in accordance with a preset target chemical concentration in the feed-water and the calculated average chemical concentration such that the average chemical concentration is held within a target chemical concentration range.

The chemical liquid amount measuring device may be one of a pressure sensor for detecting pressure generated by the chemical liquid in the chemical tank, a level gauge for detecting a chemical level height in the chemical tank, and a weight gauge for detecting chemical weight in the chemical tank.

The controller may control the chemical injection pump to operate at a target discharge rate. The target discharge rate may be resulted from multiplying the flow rate measured by the feed-water flow rate measuring device by a proportionality coefficient. The controller may correct the proportionality coefficient in accordance with a difference between a preset target chemical concentration in the feed-water and the calculated average chemical concentration.

In one embodiment of the first invention, the boiler is installed plural, the feed-water pipe includes a feed-water main pipe connected to the feed-water tank, and a plurality of feed-water branch pipes branched from the feed-water main pipe, the feed-water branch pipes are connected respectively to the boilers, feed-water pumps are disposed respectively in the feed-water branch pipes, and the chemical injection pump injects the chemical liquid into the feed-water main pipe or the feed-water tank.

A second invention provides a method for controlling chemical injection into a boiler, the method controlling the chemical injection by a boiler chemical injection control device including: a feed-water line for supplying feed-water from a feed-water tank to a boiler through a feed-water pipe provided with a feed-water pump; a feed-water flow rate measuring device for measuring a flow rate of the feed-water flowing through the feed-water pipe; a chemical injection pump for injecting a chemical liquid stored in a chemical tank into the feed-water line; a chemical liquid amount measuring device for measuring an amount of the chemical liquid stored in the chemical tank; and a controller for controlling a discharge rate of the chemical injection pump in proportion to the flow rate measured by the feed-water flow rate measuring device. An average chemical concentration in the feed-water is calculated from a feed-water amount per predetermined period and a reduction amount of the chemical liquid in the tank per the predetermined period. The feed-water amount per predetermined period is determined by the feed-water flow rate measuring device. The reduction amount of the chemical liquid in the tank per the predetermined period is determined by the chemical liquid amount measuring device. The controller controls the chemical injection pump in accordance with a preset target chemical concentration in the feed-water and the calculated average chemical concentration such that the average chemical concentration is held within a target chemical concentration range.

A chemical injection control device of a third invention includes a feed-water line for supplying feed-water from a feed-water tank to a boiler; a feed-water flow rate measuring device for measuring a flow rate of the feed-water flowing through the feed-water line; a chemical injection pump for injecting a chemical liquid containing a chemical for boiler water treatment into the feed-water line or the feed-water tank, the chemical liquid being stored in a chemical tank; a chemical liquid amount measuring device for measuring an amount of the chemical liquid stored in the chemical tank;

and a controller for controlling a discharge rate of the chemical injection pump in proportion to the feed-water flow rate measured by the feed-water flow rate measuring device. The controller executes operations of: changing a target injection amount per a first predetermined period, determining a chemical liquid amount used per the first predetermined period from a feed-water flow amount per the first predetermined period and the target injection amount in the first predetermined period, the feed-water flow amount per the first predetermined period being measured by the feed-water flow rate measuring device, determining a reduction amount of the chemical liquid in the chemical tank during a second predetermined period based on a result measured by the chemical liquid amount measuring device, the second predetermined period being longer than the first predetermined period, determining an estimated chemical liquid reduction amount in the second predetermined period by integrating the amounts of the chemical liquid used during the multiple first predetermined periods included within the second predetermined period, and comparing the chemical liquid reduction amount in the chemical tank and the estimated chemical liquid reduction amount, and controlling the chemical injection pump in accordance with a comparison result.

In the third invention, the chemical liquid amount measuring device may be one of a pressure sensor for detecting pressure generated by the chemical liquid in the chemical tank, a level gauge for detecting a chemical level height in the chemical tank, and a weight gauge for detecting chemical weight in the chemical tank.

In the third invention, the controller may execute operations of: controlling the chemical injection pump to provide a target discharge rate, the target discharge rate being resulted from multiplying the feed-water flow rate measured by the feed-water flow rate measuring device by a proportionality coefficient, and correcting the proportionality coefficient in accordance with a difference between the chemical liquid reduction amount in the chemical tank and the estimated chemical liquid reduction amount.

In one embodiment of the third invention, the boiler is installed plural, the feed-water line includes a feed-water main pipe connected to the feed-water tank, and a plurality of feed-water branch pipes branched from the feed-water main pipe, the feed-water branch pipes are connected respectively to the boilers, feed-water pumps are disposed respectively in the feed-water branch pipes, and the chemical injection pump injects the chemical liquid into the feed-water main pipe or the feed-water tank.

In the third invention, a sensor for detecting a temperature or quality of the feed-water may be disposed in the feed-water line, and the controller may change the target injection amount in accordance with a result detected by the sensor.

In one embodiment of the third invention, sensors each detecting a temperature or quality of water are disposed respectively in a make-up water line and the feed-water line, the make-up water line supplying make-up water to the feed-water tank, the controller calculates a drain recovery rate from results detected by the sensors, and the controller changes the target injection amount in accordance with the calculated drain recovery rate.

In one embodiment of the third invention, a flowmeter is disposed in a make-up water line for supplying make-up water to the feed-water tank, the controller calculates a drain recovery rate from an integrated value of flow rate values measured by the flowmeter and an integrated value of flow rate values measured by the feed-water flow rate measuring device, and the controller changes the target injection amount in accordance with the calculated drain recovery rate.

In one embodiment of the third invention, a first electrical conductivity meter is disposed in the feed-water line, the boiler is provided with a second electrical conductivity meter and a continuous blow line having a solenoid valve, the solenoid valve being closed when a value measured by the second electrical conductivity meter is not more than a predetermined value, and opened when the value measured by the second electrical conductivity meter is not less than the predetermined value, the controller calculates a concentration degree in the boiler from a value measured by the first electrical conductivity meter and the value measured by the second electrical conductivity meter, and the controller changes the target injection amount in accordance with the calculated concentration degree.

In one embodiment of the third invention, the boiler is provided with an electrical conductivity meter, and the controller reduces the target injection amount until the measured value becomes lower than a predetermined value when a value measured by the electrical conductivity meter is not less than the predetermined value.

In one embodiment of the third invention, the chemical tank, the chemical injection pump, and the chemical liquid amount measuring device are each installed plural, and the controller controls the plural chemical injection pumps individually.

A fourth invention provides a chemical injection control method for controlling a chemical injection pump injecting a chemical liquid containing one or more chemicals for boiler water treatment into a feed-water line or a feed-water tank, the feed-water line supplying feed-water from a feed-water tank to a boiler, and the chemical liquid being stored in a chemical tank. The method includes steps of: measuring a flow rate of the feed-water flowing through the feed-water line; controlling a discharge rate of the chemical injection pump in proportion to the measured feed-water flow rate; changing a target injection amount per a first predetermined period; determining a chemical liquid amount used per the first predetermined period from the feed-water flow amount per the first predetermined period and from the target injection amount in the first predetermined period, measuring a reduction amount of the chemical liquid in the chemical tank during a second predetermined period, the second predetermined period being longer than the first predetermined period, determining an estimated chemical liquid reduction amount in the second predetermined period by integrating the amounts of the chemical liquid used during the multiple first predetermined periods included within the second predetermined period, and comparing the chemical liquid reduction amount in the chemical tank and the estimated chemical liquid reduction amount, and controlling the chemical injection pump in accordance with a comparison result.

Advantageous Effects of Invention

In the first and second inventions, the chemical injection pump is proportionally-controlled in accordance with the measured value of the feed-water flow rate in a basic mode. At a time when a predetermined period, i.e., a predetermined time, has lapsed, or when an integrated value of the feed-water flow rate reaches a predetermined value, an average chemical concentration in the feed-water during the predetermined period is calculated. The average chemical concentration is determined from the chemical liquid reduction amount in the chemical tank and the integrated value of the feed-water flow rate.

The calculated chemical concentration is determined whether it is within the preset target concentration range. When the calculated chemical concentration is outside the range, the injection amount (dosage) is corrected such that a target value is satisfied. For example, the injection amount is controlled by multiplying an output signal of the feed-water flowmeter by a proportionality coefficient, and applying a resultant signal to the chemical injection pump.

Thus, the real-time proportional control of the chemical injection pump relative to the feed-water flow rate is combined with the feedback control of checking the actual average target concentration during the predetermined period and finely adjusting the chemical amount injected by the chemical injection pump. Therefore, even in a system in which the flow rate varies to a large extent in a short period as in a feed-water pipe provided with a plurality of small once-through boilers, the chemical concentration in the feed-water can be stably maintained within the target range. According to the present invention, even when the injection amount deviates from the target value due to, e.g., degradation of the performance of the chemical injection pump or the feed-water pump, the chemical injection can be performed as per the target value through automatic correction. As a result, the effect of the water treatment chemicals can be sufficiently developed, whereby proper maintenance of a boiler plant can be ensured, the occurrence of scale can be prevented, and proper blow control can be achieved. Hence an energy-saving operation can be realized. It is further possible to avoid economical losses attributable to not only an increase of a blow water amount, which is caused by the excessive injection amount, but also an increase of the chemical cost.

According to the third and fourth inventions, the real-time proportional control of the chemical injection pump relative to the feed-water flow rate is combined with the feedback control of correcting the chemical amount injected by the chemical injection pump in accordance with the result of comparing the target range of the chemical liquid reduction amount, which is determined from the target injected chemical concentration and the integrated value of the feed-water amount, with the chemical reduction amount in the chemical tank during the predetermined period. Therefore, even in the system in which the flow rate varies to a large extent in a short period, the chemical concentration in the feed-water can be stably maintained within the target range. As a result, the effect of the water treatment chemicals can be sufficiently developed, whereby proper maintenance of a boiler plant can be ensured, the occurrence of scale can be prevented, and proper blow control can be achieved. Hence an energy-saving operation can be realized. It is further possible to avoid the increase of the blow water amount, which is caused by the excessive injection amount, and the increase of the chemical cost.

BRIEF DESCRIPTION OF DRAWINGS

FIGS. 2a and 2b are graphs depicting experiment results.

FIG. 3 is a graph depicting an experiment result.
FIG. 4 is a graph depicting an experiment result.
FIG. 5 is a graph depicting an experiment result.
FIG. 6 is a graph depicting an experiment result.

DESCRIPTION OF EMBODIMENTS

[Embodiment of First and Second Inventions]

Figure 1:
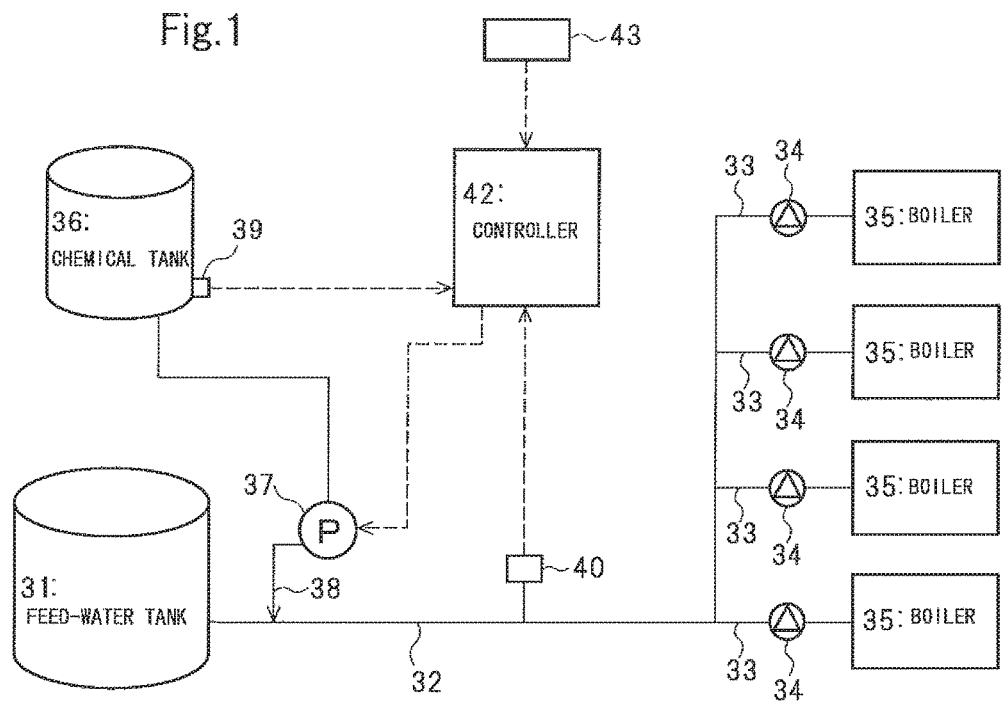
FIG. 1 is a block diagram of a facility equipped with a device for controlling chemical injection into a boiler according to an embodiment of first and second inventions.

An embodiment of first and second inventions will be described below with reference to FIG. 1. FIG. 1 is a block diagram of a boiler feed-water facility equipped with a device for controlling chemical injection into a boiler according to the embodiment. Feed-water in a feed-water tank 31 is supplied to individual boilers 35 through a feed-water main pipe 32, a plurality of feed-water branch pipes 33 branched from the feed-water main pipe 32, and feed-water pumps 34 disposed respectively in the feed-water branch pipes 33. A chemical liquid, i.e., a solution containing a chemical (e.g., an aqueous solution), in a chemical tank 36 is injected into the feed-water main pipe 32 through a chemical injection pump 37 and a chemical injection nozzle 38.

The chemical tank 36 is provided with a chemical liquid amount sensor 39 for measuring an amount of the chemical liquid. The feed-water main pipe 32 is provided with a flowmeter 40, e.g., an ultrasonic flowmeter, and a temperature sensor (not illustrated). Detection signals from the flowmeter and the temperature sensor are input to a controller 42. The controller 42 is connected to an input device 43, such as a touch panel or a keyboard through which a target chemical concentration in the feed-water, etc. are input.

The present invention is suitably applied to a device for controlling chemical injection in a feed-water facility equipped with a plurality of small once-through boilers. However, the present invention is further suitably applied to a boiler feed-water facility in which a flow rate varies to a large extent in a short period, other than the feed-water facility equipped with the plurality of small once-through boilers.

The feed-water pump 34 may be operated with ON/OFF control or inverter control depending on a water level in the boiler 35. Thus, a control mode of the feed-water pump 34 is not limited to particular one.

In the facility including the plurality of small once-through boilers, one or more chemicals are desirably injected into the feed-water tank 31 or the feed-water main pipe 32. The reason is that the chemicals can be added more uniformly as distances through which the feed-water flows until entering the individual boilers increase. The chemical concentration in the feed-water can be quickly controlled by injecting the chemicals into the feed-water main pipe 32. Preferably, a check valve adapted for pressure in the feed-water tank or the feed-water pipe is installed on the feed side of the chemical injection pump 37.

A chemical used here may be each a product available in a liquid state, or a liquid obtained by dissolving powder. Other conditions (pH, gravity, etc.) are optionally selectable.

The chemical tank 36 desirably has a uniform horizontal cross-sectional area from the top to the bottom of the tank. From the viewpoint of increasing resolution for a detected value of the chemical liquid reduction amount, the chemical tank 36 is preferably selected as one having the volume and the horizontal cross-sectional area as small as possible within a range where no problems occur in practical use.

The chemical tank 36 preferably has an alarm function in consideration of an urgent event that the chemical injection control device fails to execute the control. Specific examples of the urgent event may be the case where a measured value does not fall within the target chemical concentration range several times due to, e.g., liquid leakage from the chemical tank 36 and the chemical injection pump 37, the case where the chemical liquid has been exhausted out, or the case where a signal line is disconnected. Moreover, because the chemical liquid reduction amount is monitored by the chemical liquid amount sensor 39, the control device preferably has the function of notifying an event that a water level has lowered down to a certain level or below, to an operator in advance through the controller 42 and a communication device.

When the chemical liquid is added to the chemical tank 36 and the detected value of the chemical liquid amount sensor 39 associated with the chemical tank 36 is abruptly increased, the integrated values of the feed-water flow rate and the chemical liquid reduction amount, which are used to calculate the injection amount, are automatically reset such that the injection amount can be calculated correctly.

For example, a pressure sensor can be used as the sensor 39 for measuring the chemical liquid amount in the chemical tank 36. The pressure sensor is to detect the hydraulic head pressure of the chemical liquid from a sensor position to a liquid surface. Therefore, the sensor 39 is preferably installed horizontally in a hole that is bored through a side wall of the chemical tank 36 in its bottom portion. The chemical liquid amount in the chemical tank 36 is determined by multiplying the liquid level, which is detected by the pressure sensor, by the horizontal cross-sectional area of the chemical tank 36, which has been determined in advance. Thus, the pressure sensor used here is selected as one having a measurable pressure range that includes the hydraulic pressure at a maximum liquid level in the chemical tank 36. Furthermore, the pressure sensor used here is to be resistant against the chemical liquid. If an upper limit value of the measurable pressure range is much higher than the hydraulic pressure at the maximum liquid level in the chemical tank, a resolvable value in measurement of the chemical liquid reduction amount is increased. Thus, a pressure sensor having an excessively wide pressure range is not to be selected.

The flowmeter 40 is preferably able to output signals of both an instantaneous flow rate and an integrated flow rate, but it may be able to output a signal of only the instantaneous flow rate. In that case, the integrated flow rate is calculated by accumulating successive instantaneous values in an arithmetic unit.

The controller 42 used here has the function of controlling a discharge rate of the chemical injection pump 37 in proportion to a flow rate signal from the flowmeter 40. For example, a commercially available PLC (programmable logic controller) can be used as an arithmetic device of the controller 42. An input unit and an output unit are each desirably selected as one having a resolvable value as small as possible, and a high operation speed.

One example of a chemical injection control method executed by the controller 42 will be described below.

In this chemical injection control method, the chemical injection pump 37 is proportionally-controlled in accordance with the output signal of the feed-water flowmeter 40 in a basic mode. More specifically, a flow rate signal detected by the feed-water flowmeter 40 is multiplied by a proportionality coefficient to generate an injection amount signal, and the injection amount signal is applied to a drive circuit for the chemical injection pump 37, thus performing the chemical injection.

At a time when a predetermined period has lapsed, namely when a predetermined time has lapsed or when the integrated value of the feed-water flow rate reaches a predetermined integrated flow rate value, an average chemical concentration in the feed-water during the predetermined period is calculated. The predetermined time or the predetermined integrated flow rate value is preferably determined on condition that a liquid level difference corresponding to the chemical liquid reduction amount in the chemical tank during the predetermined period is 50 mm or more.

The average chemical concentration is determined from the gravity of the chemicals, which has been input in advance, the chemical liquid reduction amount in the chemical tank 36, and the integrated value of the feed-water flow rate, which is detected by the flowmeter 40. When the chemical liquid amount sensor 39 is of the type detecting the liquid level, the chemical liquid reduction amount in the chemical tank 36 can be determined by multiplying a detected difference of the liquid level by the horizontal cross-sectional area of the chemical tank 36.

Whether the calculated actual average chemical concentration in the feed-water is within a preset target concentration range is determined. If the calculated average chemical concentration is outside the range, the proportionality coefficient is corrected such that a target concentration is satisfied. The injection amount signal obtained by multiplying the feed-water flow rate signal by the corrected proportionality coefficient is applied to the drive circuit for the chemical injection pump, thus correcting the injection amount. For example, when the average chemical concentration is lower than the target range, the proportionality coefficient is increased, and when the average chemical concentration is higher than the target range, the proportionality coefficient is decreased.

For example, when the actual average chemical concentration in the feed-water is lower than a lower limit value of the target range, the proportionality coefficient is corrected to increase by multiplying the proportionality coefficient by a correction coefficient that corresponds to the difference between the lower limit value and the actual average chemical concentration. Conversely, when the actual average chemical concentration in the feed-water is higher than an upper limit value of the target range, the proportionality coefficient is corrected to decrease by multiplying the proportionality coefficient by a correction coefficient that corresponds to the difference between the higher limit value and the actual average chemical concentration. Alternatively, the injection amount signal obtained after multiplying the proportionality coefficient may be corrected instead of correcting the proportionality coefficient.

Thus, the control of making the discharge rate of the chemical injection pump 37 proportional to the feed-water flow rate detected by the flowmeter 40 in real time is combined with the feedback control of checking the average chemical concentration during the predetermined period and finely adjusting a signal value applied to the chemical injection pump 37. Therefore, even in a system in which the flow rate varies to a large extent in a short period as in a feed-water pipe provided with a plurality of small once-through boilers, the chemical concentration in the feed-water can be stably maintained within the target range.

EXAMPLES of the first and second inventions and COMPARATIVE EXAMPLES will be described below. In these EXAMPLES and COMPARATIVE EXAMPLES, the chemical liquid was prepared as a solution in which were dissolved potassium hydroxide (5% product) as a pH adjuster, hydrazine monohydrate (20% product) as a deoxidizer, and polyacrylic acid with molecular weight of 4000 as a scale preventive.

EXAMPLE 1-1

Under control according to the method of the present invention, the chemical liquid was injected into the feed-water main pipe 32 in the facility, illustrated in FIG. 1 on condition that the target chemical concentration in the feed-water was 100 mg/L. The facility was equipped with four small once-through boilers (NBO-500N made by SAMSON CO., LTD.). In order to check proper development of the chemical injection control function, the facility was operated in a manner of setting the number of pump strokes at startup of the operation so as to provide the chemical concentration of 50 mg/L, and obtaining the chemical concentration of 100 mg/L after 1 hour from the startup of the operation with the correction under the feedback control through calculation of the chemical concentration. A chemical injection point was set to a position away from an outlet of the feed-water tank through a distance of 500 mm. The chemical liquid was injected in a state that the nozzle 38 made of SUS and having an inner diameter of 6 mm and an outer diameter of 8 mm was inserted to a center of the feed-water main pipe 32 with a pipe diameter 40A.

The Dailite Tank (N type) of 50 L made by DAILITE CO., LTD. was used as the chemical tank 36. A lower portion of the tank was worked into a state enabling the pressure sensor to be screwed into the tank.

KV-1000 made by KEYENCE CORPORATION was used as the controller 42, KV-40DA was used as the input unit, and KV-40AD was used as the output unit. EHN-B11VC1YN made by IWAKI CO., LTD. was used as the chemical injection pump 37, the clamp-on ultrasonic flowmeter UL330 made by TOKYO KEISO CO., LTD. was used as the feed-water flowmeter 40, and HT1-02OKP-02-V made by SENSEZ Corporation was used as the chemical liquid amount sensor (pressure sensor).

The feed-water flowmeter 40 detects the integrated flow rate by employing a pulse signal of 1 pulse/0.1 L, and detects the instantaneous flow rate by employing analog signals of 4 to 20 mA corresponding to 0 to 3500 L/h. The pressure ranging from 0 to 20 kPa, detected by the pressure sensor, was input as a signal of 4 to 20 mA to the arithmetic unit. The injection amount was adjusted with the chemical injection pump 37 by controlling the number of strokes per minute with signals of 4 to 20 mA corresponding to 0 to 38 mL/min.

The boiler was operated in a high-combustion fixed mode. The feed-water amount was 400 L/h per boiler, and the performance of the feed-water pump 34 was 1350 L/h. The temperature within the feed-water tank 31 was maintained at 35° C. A dissolved oxygen concentration in the feed-water was 7.0 mg/L.

The proportionality coefficient (analog value of the chemical injection pump/analog value of the feed-water flow rate) at the startup of the operation was set to 7.6% such that the chemical concentration in the feed-water was 50 mg/L.

The target value of the chemical concentration in the feed-water was set to 100 mg/L. Aiming to obtain the target chemical concentration after 1 hour, an analog signal value of the feed-water flowmeter 40 was multiplied by the proportionality coefficient and the correction coefficient, and a resultant value was sent as a control signal for the injection amount to the drive circuit for the chemical injection pump 37. A target lower limit value of the chemical concentration was set to 90 mg/L, and a target upper limit value thereof was set to 110 mg/L. The injection amount was calculated per predetermined period, i.e., 1 hour. If a calculated result did not fall within the range (90 to 110 mg/L) of the target chemical concentration, the proportionality coefficient to be multiplied by the analog signal value of the feed-water flowmeter 40 was corrected. More specifically, when the calculated result was 80 mg/L, a value resulting from dividing the target value 100 mg/L by 80 mg/L, i.e., 1.25, was multiplied by the current proportionality coefficient. When the calculated result was 120 mg/L, a value resulting from dividing the target value 100 mg/L by 120 mg/L, i.e., 0.83, was multiplied by the current proportionality coefficient. The injection amount signal obtained by multiplying the analog signal value of the feed-water flowmeter by a signal conversion rate, corrected as described above, was sent to the drive circuit for the chemical injection pump 37.

An electrical conductivity meter was installed corresponding to each of the individual feed-water branch pipes 33 for the small once-through boilers 35, and electrical conductivity was continuously measured over time. FIG. 2a depicts the measured result. Furthermore, part of vapor in the boiler was branched and cooled by a heat exchanger such that the temperature of condensed water was 40° C. Then, the condensed water was passed continuously for 24 hours through a synthetic resin column in which a test piece (SPCC, polished with #400, after being subjected to an etching process) was installed. A corrosion rate was calculated from the weight difference of the test piece between before and after exposure to the condensed water. The condensed water having passed through the synthetic resin column was further cooled by a heat exchanger to 25° C., and the dissolved oxygen concentration in the condensed water was monitored continuously. Table 1 indicates the measured results of an average value of the dissolved oxygen concentration in the condensed water and the corrosion rate of the test piece after 24 hours.

COMPARATIVE EXAMPLE 1-1

The facility was operated under the same conditions as those in EXAMPLE 1-1 except for not correcting the injection amount. FIG. 2b depicts time-dependent change of the electrical conductivity. The measured results of the dissolved oxygen concentration in the condensed water and the corrosion rate of the test piece in COMPARATIVE EXAMPLE 1-1 were also indicated in Table 1.

COMPARATIVE EXAMPLE 1-2

In COMPARATIVE EXAMPLE 1-2, the chemical injection control was performed, differently from EXAMPLE 1-1, in a manner based on the microcomputer control function of the boiler. In this case, on an assumption that the boiler has the vapor generation capability of 500 L/h in a high combustion state and 250 L/h in a low combustion state, an operation time of the chemical injection pump can be determined by calculating a required feed-water amount after a predetermined time from an operation time in each combustion state. Because the facility was operated here in the high-combustion fixed mode, the chemical injection pump was set to be operated for 3 sec at a time when the feed-water of 30 L was supplied for the operation time of 3.6 min on an assumption that the vapor generation capability was 500 L/h.

The metering pump PZD-30-VTCET-BWJ made by TACMINA CORPORATION was installed as the chemical injection pump for each boiler. The other conditions were the same as those in EXAMPLE 1-1. FIG. 3 depicts time-dependent change of the electrical conductivity. The measured results of the dissolved oxygen concentration in the condensed water and the corrosion rate of the test piece in COMPARATIVE EXAMPLE 1-2 were also indicated in Table 1.

COMPARATIVE EXAMPLE 1-3

In COMPARATIVE EXAMPLE 1-3, the chemical injection control was performed, differently from EXAMPLE 1-1, in a mode of turning ON/OFF the chemical injection pump 37 in conjunction with ON/OF of the feed-water pump 34. The metering pump PZD-30-VTCET-BWJ made by TACMINA CORPORATION was installed as the feed-water pump 34 for each boiler. The stroke length was set to 50% and the number of strokes per minute was set to 6% in order to obtain the injection amount of 100 mg/L. The other conditions were the same as those in EXAMPLE 1-1. FIG. 4 depicts time-dependent change of the electrical conductivity. The measured results of the dissolved oxygen concentration in the condensed water and the corrosion rate of the test piece in COMPARATIVE EXAMPLE 1-3 were also indicated in Table 1.

TABLE 1

Comparison of water treatment effects obtained with various control methods

| | Average Value of Dissolved Oxygen Concentration (mg/L) | Corrosion Rate of Test Piece (mdd) |
|---|---|---|
| EXAMPLE 1-1 | 1.0 | 19.5 |
| COMPARATIVE EXAMPLE 1-1 | 2.3 | 35.0 |
| COMPARATIVE EXAMPLE 1-2 | 3.5 | 56.8 |
| COMPARATIVE EXAMPLE 1-3 | 5.2 | 63.8 |

[Reviews]

As seen from FIGS. 2 to 4, the injection rate was corrected to the target value after 1 hour with the control according to the method of the present invention, although the initially set value is deviated from the target value. The electrical conductivity attributable to the chemicals was held constant in the method of the present invention. In COMPARATIVE EXAMPLES 1-1 to 1-3, the electrical conductivity remained low, or variations of the electrical conductivity were large in the cases executing the ON/OFF control and the microcomputer control of the feed-water pump. The electrical conductivity is in proportion to the chemical concentration in the feed-water. It is hence understood that, by executing the control according to the method of the present invention, the water treatment chemicals can be uniformly injected even for a fluid flowing through a pipe at a flow rate that varies to a large extent in a short time.

Furthermore, as seen from Table 1, since the chemical was injected as per the target value with the control according to the present invention, the effect of the deoxidizer was sufficiently developed, and the average value of the dissolved oxygen concentration was held smaller than those obtained with the other chemical injection control methods. As a result, the corrosion rate of the test piece was held smaller than those obtained with the other chemical injection control methods.

EXAMPLES 1-2 and 1-3

In order to check proper development of the function of automatically correcting the injection amount when the performance of the chemical injection pump or the feed-water pump degraded, the chemical injection was performed in accordance with the method of the present invention under a condition modified from among the conditions of EXAMPLE 1-1 in that the stroke length of the chemical injection pump was changed from 100% to 50% (EXAMPLE 1-2), and that the opening degree of an outlet valve of the feed-water pump was reduced to half (EXAMPLE 1-3). The obtained results are indicated in FIGS. 5 and 6 and Tables 2 and 3.

TABLE 2

Results of checking function of automatically correcting injection amount with method of present invention

| | Timing Interval for Measuring Injection Amount | | | | | |
|---|---|---|---|---|---|---|
| | ~(1) | (1)~(2) | (2)~(3) | (3)~(4) | (4)~(5) | (5)~(6) |
| Stroke of Chemical Injection Pump | 100% | 100% | 100%→50% | 50% | 50% | 50% |
| Injection Amount (mg/L) | 101 | 99 | 56 | 81 | 102 | 102 |

TABLE 2-continued

Results of checking function of automatically correcting injection amount with method of present invention

| | Timing Interval for Measuring Injection Amount | | | | | |
|---|---|---|---|---|---|---|
| | ~(1) | (1)~(2) | (2)~(3) | (3)~(4) | (4)~(5) | (5)~(6) |
| Average Electrical Conductivity (mS/m) | 19.0 | 18.7 | 10.5 | 15.2 | 19.2 | 19.1 |

TABLE 3

Results of checking function of automatically correcting injection amount with method of present invention

| | Timing Interval for Measuring Injection Amount | | | | | |
|---|---|---|---|---|---|---|
| | ~(1) | (1)~(2) | (2)~(3) | (3)~(4) | (4)~(5) | (5)~(6) |
| Valve Opening Degree of Feed-Water Pump | 100% | 100% | 100%→50% | 50% | 50% | 50% |
| Injection Amount (mg/L) | 103 | 104 | 184 | 167 | 112 | 104 |
| Average Electrical Conductivity (mS/m) | 18.3 | 18.5 | 32.7 | 29.8 | 19.8 | 18.5 |

[Reviews]

In EXAMPLE 1-2, as seen from FIG. 5 and Table 2, the electrical conductivity was reduced immediately after the reduction of the stroke length of the chemical injection pump to half because the injection amount was also reduced to half. However, the number of pulses applied to the chemical injection pump was corrected at timings (3) and (4) in checking the injection amount, i.e., at each timing of correcting the injection amount, whereby the electrical conductivity was restored to the initial value.

Moreover, as seen from FIG. 6 and Table 3, in EXAMPLE 1-3 in which the valve opening degree of the feed-water pump valve was reduced to half, the electrical conductivity attributable to the chemicals was increased because the injection amount was relatively increased twice. However, the number of pulses applied to the chemical injection pump was corrected at the timings (3) and (4) in checking the injection amount, i.e., at each timing of correcting the injection amount, whereby the electrical conductivity was restored to the initial value.

As described above, by performing the chemical injection control in accordance with the method of the present invention, even when the injection amount deviates from the target value due to, e.g., reduction of the performance of the chemical injection pump or the feed-water pump in the boiler feed-water facility where the flow rate of a fluid flowing through a pipe varies to a large extent in a short time, the automatic correction is executed such that the chemical injection can be performed as per the target value.

[Embodiment of Third and Fourth Inventions]

Figure 7:
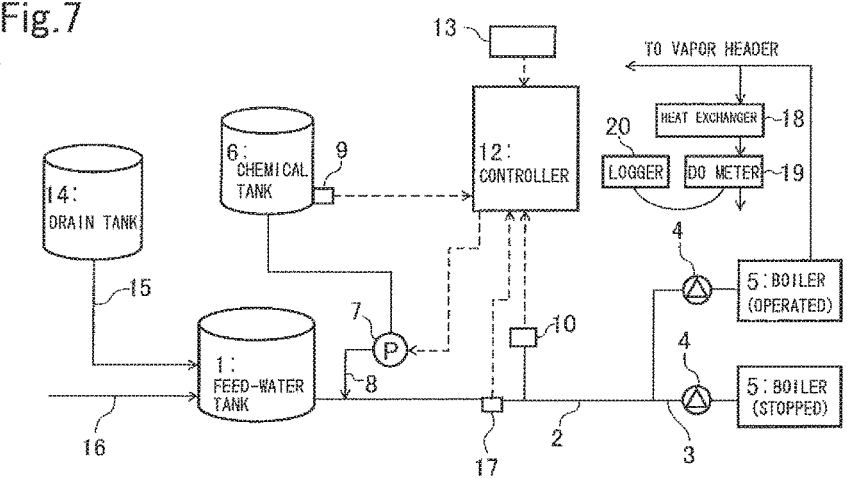
FIG. 7 is a block diagram of a boiler feed-water facility according to an embodiment of third and fourth inventions.

An embodiment of third and fourth inventions will be described below with reference to FIG. 7. FIG. 7 is a block diagram of a boiler feed-water facility equipped with a device for controlling chemical injection into a boiler according to the embodiment. Feed-water in a feed-water tank 1 is supplied to individual boilers 5 through a feed-water main pipe 2, a plurality of feed-water branch pipes 3 branched from the feed-water main pipe 2, and feed-water pumps 4 disposed respectively in the feed-water branch pipes 3. A chemical liquid, i.e., a solution containing one or more chemicals for boiler water treatment, is stored in a chemical tank 6, and the chemical liquid is injected into the feed-water main pipe 2 through a chemical injection pump 7 and a chemical injection nozzle 8.

The chemical tank 6 is provided with a chemical liquid amount sensor 9 for measuring an amount of the chemical liquid. The feed-water main pipe 2 is provided with a flowmeter 10, e.g., an ultrasonic flowmeter, and a temperature sensor 17. Detection signals from the flowmeter and the temperature sensor are input to a controller 12. The controller 12 is connected to an input device 13, such as a touch panel or a keyboard through which a target chemical concentration in the feed-water, etc. are input.

The chemical injection control device according to this embodiment is suitably used as a device for controlling chemical injection in a feed-water facility equipped with a plurality of small once-through boilers, but it is also suitably applied to a boiler feed-water facility in which a flow rate varies to a large extent in a short period, other than the feed-water facility equipped with the plurality of small once-through boilers.

The feed-water pump 4 may be operated with ON/OFF control or inverter control depending on a water level in the boiler 5. Thus, a control mode of the feed-water pump 4 is not limited to particular one.

In the facility including the plurality of small once-through boilers, the chemicals are desirably injected into the feed-water tank 1 or the feed-water main pipe 2 through the chemical injection nozzle 8. The reason is that the chemicals can be added more uniformly as distances through which the feed-water flows until entering the individual boilers increase. The chemical concentration in the feed-water can be quickly controlled by injecting the chemicals into the feed-water main pipe 2. Preferably, a check valve adapted for pressure in the feed-water tank 1 or the feed-water main pipe 2, which is connected to the check valve, is installed on the delivery side of the chemical injection pump 7.

The chemicals used here are each a product available in a liquid state or a liquid obtained by dissolving powder. Other conditions (pH, gravity, etc.) are optionally selectable.

The chemical tank 6 desirably has a circular or rectangular cylindrical shape with a uniform horizontal cross-sectional area from the top to the bottom of the tank. From the viewpoint of accurately detecting the chemical liquid amount in the chemical tank 6 by the chemical liquid amount sensor 9, the chemical tank 6 is preferably selected as one having the volume and the horizontal cross-sectional area as small as possible within a range where no problems occur in practical use.

The chemical tank 6 preferably has an alarm function in consideration of an urgent event. Specific examples of the urgent event may be the case where a measured injection amount does not fall within a target concentration range several times due to liquid leakage from the chemical tank 6 and the chemical injection pump 7, the case where the chemical liquid in the chemical tank 6 has been exhausted out, or the case where a signal line is disconnected. Because the chemical liquid reduction amount in the chemical tank 6 is monitored by the chemical liquid amount sensor 9, the control device preferably has the function of notifying an event that a liquid level has lowered down to a certain level or below, to an operator in advance through the controller 12 and a communication device (not illustrated).

When the chemical liquid is added to the chemical tank 6 and the detected value of the chemical liquid amount sensor 9 is abruptly increased, integrated values of the feed-water flow rate and the chemical liquid reduction amount, which are used to calculate the injection amount, are automatically reset such that the injection amount can be calculated correctly.

For example, a pressure sensor can be used as the chemical liquid amount sensor 9 for measuring the chemical liquid amount in the chemical tank 6. The pressure sensor is to detect the hydraulic head pressure of the chemical liquid from a sensor position to a liquid surface. Therefore, the chemical liquid amount sensor 9 is preferably installed horizontally in a hole that is bored through a side wall of the chemical tank 6 in its bottom portion. The chemical liquid amount in the chemical tank 6 is determined by multiplying the liquid level, which is detected by the pressure sensor, by the horizontal cross-sectional area of the chemical tank 6, which has been determined in advance. Thus, the pressure sensor used here is selected as one having a measurable pressure range that includes the hydraulic pressure at a maximum liquid level in the chemical tank 6. Furthermore, the pressure sensor used here is to be resistant against the chemical liquid. If an upper limit value of the measurable pressure range is much higher than the hydraulic pressure at the maximum liquid level in the chemical tank 6, a resolvable value in measurement of the chemical liquid amount is increased, and accuracy in detecting change of the chemical liquid amount in the chemical tank 6 is decreased. Thus, the pressure sensor used here is preferably a pressure sensor having the upper limit value of the measurable pressure range, which is a little higher than the hydraulic pressure at the maximum liquid level in the chemical tank 6, rather than a pressure sensor having an excessively wide pressure range.

The chemical liquid amount sensor 9 may be a level gauge for detecting the height of a liquid level in the chemical tank 6, or a weight gauge for detecting the weight of the chemical liquid in the chemical tank 6.

The flowmeter 10 is preferably able to output signals of both an instantaneous flow rate and an integrated flow rate, but it may be able to output a signal of only the instantaneous flow rate. When the flowmeter 10 outputs only the instantaneous flow rate, the integrated flow rate is calculated by accumulating successive instantaneous values in an arithmetic unit of the controller 12. Even with the flowmeter 10 outputting only the integrated flow rate, the control is adaptably performed by converting the integrated value in a short interval to an average flow rate in the arithmetic unit, but a time lag occurs from the start of supply of the feed-water until the start of the chemical injection. Accordingly, the flowmeter 10 is preferably able to output the signal of the instantaneous flow rate as well.

The controller 12 controls a discharge rate of the chemical injection pump 7 in proportion to a flow rate signal from the flowmeter 10. For example, a PLC (programmable logic controller) can be used as an arithmetic device of the controller 12. An input unit and an output unit for the controller 12 are each desirably selected as one having a small resolvable value and a high operation speed.

One example of a chemical injection control method executed by the controller 12 will be described below.

In a basic mode, the controller 12 proportionally-controls the chemical injection pump 7 in accordance with the output signal of the flowmeter 10. More specifically, the controller 12 multiplies a flow rate signal detected by the flowmeter 10 by a proportionality coefficient to generate an injection amount signal, and applies the injection amount signal to a drive circuit for the chemical injection pump 7, thus performing the chemical injection.

Furthermore, the controller 12 determines a target injection amount (target injected chemical concentration) per first predetermined period, and changes the pump performance (%) at a ratio of the n-th target injection amount/the (n−1)-th target injection amount. The target injection amount is determined depending on the temperature and the quality of the feed-water, the drain recovery rate, the degree of concentration in the boiler 5, etc. A method of determining the target injection amount will be described later. The first predetermined period in determining the target injection amount is determined depending on variations in the drain recovery or the quality of raw water and the feed-water. The target injection amount is preferably determined per period of minute to day, and more preferably per period of 10 to 60 minutes. In addition, the controller 12 calculates, per the first predetermined period, a used chemical amount, i.e., a chemical reduction amount in the chemical tank 6, from the target injected chemical concentration and a volume of the feed-water (an integrated volume of the flow rate) during the first predetermined period.

At a time when a second predetermined period longer than the first predetermined period has lapsed, for example, when a predetermined time has lapsed or when the integrated value of the feed-water flow rate has reached a predetermined integrated flow rate value, the controller 12 further calculates an estimated chemical reduction amount during the second predetermined period. The estimated chemical reduction amount is an integrated value of the chemical amounts used during the multiple first predetermined periods included within the second predetermined period. The predetermined time or the predetermined integrated flow rate value corresponding to the second predetermined period is preferably determined under conditions that a liquid level difference corresponding to the chemical liquid reduction amount in the chemical tank 6 during the second predetermined period is 50 mm or more. If the liquid level difference is 50 mm or less, a ratio of the chemical liquid reduction amount per unit value of resolution of the chemical liquid amount sensor 9 to the chemical reduction amount during the second predetermined period is increased, and an error relative to the actual injection amount is increased.

Expressing the target injection amounts during periods $T_1, T_2, \ldots, T_n$ as $CF_1, CF_2, \ldots, CF_n$ and expressing the feed-water flow rates (integrated flow rates during the periods) as $FV_1, FV_2, \ldots, FV_n$, respectively, used chemical amounts $CD_1, CD_2, \ldots, CD_n$ are expressed as follows.

Period T1: $CD_1 = CF_1 \times FV_1$

Period T2: $CD_2 = CF_2 \times FV_2$

...

Period Tn: $CD_n = CF_n \times FV_n$

Each of the periods $T_1, T_2, \ldots, T_n$ corresponds to the first predetermined period, and a total period of T1 to Tn corresponds to the second predetermined period. The estimated chemical reduction amount SV is given by $SV = CD_1 + CD_2 + \ldots + CD_n$.

The controller 12 determines whether the actual chemical reduction amount in the chemical tank 6 during the second predetermined period, which has been measured by the chemical liquid amount sensor 9, is matched with the estimated chemical reduction amount that has been obtained by integrating the chemical amount used during the second predetermined period, more specifically, whether the actual chemical reduction amount is within a target range including an allowable error. If the actual chemical reduction amount is outside the target range, the proportionality coefficient is corrected such that the actual chemical reduction amount is matched with the target value. Then, the controller 12 generates the injection amount signal by multiplying the feed-water flow rate signal by the corrected proportionality coefficient, and corrects the injection amount by applying the injection amount signal to the drive circuit for the chemical injection pump 7. For example, the controller 12 increases the proportionality coefficient when the chemical reduction amount measured by the chemical liquid amount sensor 9 is lower than the target range, and decreases the proportionality coefficient when the chemical reduction amount is higher than the target range.

In a more specific example, when the chemical reduction amount measured by the chemical liquid amount sensor 9 is lower than a lower limit value of a target error range of the estimated chemical reduction amount, the controller 12 corrects the proportionality coefficient to increase by multiplying the proportionality coefficient by a correction coefficient corresponding to the difference between the estimated chemical reduction amount and the actual chemical reduction amount, the latter being measured by the chemical liquid amount sensor 9. Conversely, when the actual chemical reduction amount is higher than a higher limit value of the target error range of the estimated chemical reduction amount, the controller 12 corrects the proportionality coefficient to decrease by multiplying the proportionality coefficient by a correction coefficient corresponding to the difference between the estimated chemical reduction amount and the actual chemical reduction amount. In correcting the proportionality coefficient, the controller may set a limitation to a change rate of the proportionality coefficient such that the proportionality coefficient after the correction is held within, e.g., ±50% of the proportionality coefficient before the correction.

Instead of correcting the proportionality coefficient, the injection amount signal after multiplying the proportionality coefficient may be corrected depending on the difference between the estimated chemical reduction amount and the actual chemical reduction amount.

Thus, even in a system in which the flow rate varies to a large extent in a short period as in the feed-water pipe provided a the plurality of small once-through boilers, the chemical concentration in the feed-water can be stably maintained within the target range by combining the real-time control of making the discharge rate of the chemical injection pump 7 proportional to the feed-water flow rate detected by the flowmeter 10 and the feedback control of checking the chemical reduction amount during the predetermined period (second predetermined period) and finely adjusting the injection amount signal.

Example of the method of determining the target injection amount will be described below.

In one example, a temperature of the feed-water is measured by the temperature sensor 17, and the target injection amount is changed as needed corresponding to a saturated-dissolved oxygen concentration at the measured temperature. This method enables the deoxidizer to be injected more efficiently and economically. In the case using the above method, a required deoxidizer amount is calculated from the following Eq. 1, and a target chemical liquid amount is determined depending on the required deoxidizer amount. While the method of measuring the temperature of the feed-water and utilizing the saturated-dissolved oxygen concentration at the measured temperature is simple, the dissolved oxygen concentration in the feed-water may be directly measured by installing a dissolved oxygen meter that detects dissolved oxygen in the feed-water.

Required deoxidizer amount (mg/L)=(saturated-dissolved oxygen concentration at temperature of feed-water/amount of oxygen removed by deoxidizer of 1 (mg/L))×safety factor   (Eq. 1)

The measurement principle of the temperature sensor 17 is optionally selectable, but a measured temperature range of the temperature sensor 17 is required to sufficiently cover a variation range of the feed-water temperature. The temperature sensor 17 is installed in the feed-water tank 1 or in the feed-water main pipe 2 at a position closer to the boiler 5 than the feed-water tank 1. While a detection portion of the temperature sensor 17 is desirably directly immersed in the feed-water, the detection portion may be disposed on the pipe surface and may be covered with a lagging material to prevent dissipation of heat.

In another example, the target injection amount is determined in accordance with a drain recovery rate. The drain recovery rate can be determined by a method of measuring a drain temperature, a make-up water temperature, and a feed-water temperature, and calculating the drain recovery rate from the following Eq. 2, a method of measuring the electrical conductivity of each of the make-up water and the feed-water by an electrical conductivity meter, and calculating the drain recovery rate from the following Eq. 3, a method of detecting a dissolved substance concentration (water quality) in each of the make-up water and the feed-water by an electrical conductivity meter, and calculating the drain recovery rate from the following Eq. 4, or a method of putting, into the following Eq. 5, an integrated value measured by a flowmeter (see FIG. 12) installed in a make-up water line 16 and an integrated value measured by the flowmeter 10 installed in the feed-water main pipe 2 or an integrated total value measured by flowmeters (see FIG. 12) installed in the feed-water branch pipes connected to the individual boilers 5. The dissolved substance concentration is, for example, a chloride ion concentration detected by a chloride ion meter, a potassium concentration detected by a potassium meter, a sodium concentration detected by a sodium meter, or a calcium concentration detected by a calcium meter. The drain recovery rate may be determined by employing suitable one of other equations or methods. The recovered drain is stored in a drain tank 14 and is supplied to the feed-water tank 1 through a drain line 15.

$$\text{Drain recovery rate}=(\text{feed-water temperature}-\text{make-up water temperature})/(\text{drain temperature}-\text{make-up water temperature}) \quad \text{(Eq. 2)}$$

$$\text{Drain recovery rate}=1-(\text{electrical conductivity of feed-water}/\text{electrical conductivity of make-up water}) \quad \text{(Eq. 3)}$$

$$\text{Drain recovery rate}=1-(\text{dissolved substance concentration in feed-water}/\text{dissolved substance concentration in make-up water}) \quad \text{(Eq. 4)}$$

$$\text{Drain recovery rate}=[(\text{feed-water volume})-(\text{make-up water volume})]/(\text{feed-water volume}) \quad \text{(Eq. 5)}$$

Even when the drain is not recovered, the quality of the feed-water may vary to a large extent depending on variations in the quality of the raw water. In such a case, there is practicably a method of measuring a value of the electrical conductivity or the dissolved substance concentration, e.g., the chloride ion concentration, in the feed-water, and calculating the injection amount from the measured value. Even in the case where the concentration of a substance necessary to determine the target injection amount can not be directly measured, if the correlation between the relevant substance and another item, which is easy to measure, are found in advance, the required injection amount can be calculated from a measured value of the relevant item.

In the case of determining the target injection amount from an acid consumption (pH 4.8) in the feed-water, for example, if the correlation between the electrical conductivity and the acid consumption (pH 4.8) is found, a discharge amount of the chemical injection pump can be determined by measuring the electrical conductivity, converting the measured electrical conductivity to the acid consumption (pH 4.8) in the arithmetic unit, and calculating the target injection amount on the basis of the obtained acid consumption (pH 4.8).

When an alkali component concentration in the feed-water is varied due to the drain recovery, an alkali component amount to be added as a chemical is determined from the following Eqs. 6 and 7.

$$\text{Target injection amount}=\text{required alkali component amount (acid consumption (pH 8.3))}/\text{acid consumption (pH 8.3) contained in 1 mg/L of chemical liquid} \quad \text{(Eq. 6)}$$

$$\text{Required alkali component amount (acid consumption (pH 8.3)) (mg-CaCO}_3\text{/L)} = [\text{target acid consumption (pH 8.3) of boiler-water}/(\text{concentration degree})]-[\text{acid consumption (pH 8.3) of feed-water}]=(P1/N)-[P2\times0.5\times(1+\alpha)\times(1-r)] \quad \text{(Eq. 7)}$$

P1: target acid consumption (pH 8.3) (mg-CaCO$_3$/L) of boiler-water

P2: acid consumption (pH 4.8) (mg-CaCO$_3$/L) of make-up water

N: concentration degree=electrical conductivity of boiler water/electrical conductivity of feed-water α: coefficient depending on pressure
  α=0.3 at boiler pressure 0.5 MPa
  α=0.4 at boiler pressure 0.7 MPa
  α=0.5 at boiler pressure 1.0 MPa
  α=0.6 at boiler pressure 1.5 MPa
  α=0.7 at boiler pressure 2.0 MPa r: drain recovery rate=1−(electrical conductivity of feed-water/electrical conductivity of make-up water)

The boiler 5 may incorporate an electrical conductivity meter, and the concentration degree of boiler water may be adjusted by closing a solenoid valve in a continuous blow line when a measured value of the electrical conductivity meter is lower than a predetermined lower limit value, and by opening the solenoid valve in the continuous blow line when the measured value of the electrical conductivity meter is higher than a predetermined upper limit value. In this case, the controller 12 calculates the concentration degree from the following Eq. 8 by employing both the electrical conductivity of the boiler water, which is measured by the electrical conductivity meter incorporated in the boiler 5, and the electrical conductivity of the feed-water, which is measured by an electrical conductivity meter disposed in the feed-water main pipe 2 or the feed-water branch pipe 3. Then, the controller 12 can determine the target injection amount from the concentration degree in the boiler 5 and the concentration to be maintained in the boiler 5 by employing the following Eq. 9. When the boiler itself is able to output information of the concentration degree or information for calculating the concentration degree, the information may be directly input to the controller 12.

$$\text{Concentration degree}=\text{electrical conductivity of boiler water}/\text{electrical conductivity of feed-water} \quad \text{(Eq. 8)}$$

$$\text{Target injection amount (mg/L)}=\text{concentration to be maintained in boiler}/\text{concentration degree} \quad \text{(Eq. 9)}$$

The concentration degree in the boiler 5 may be determined from respective dissolved substance concentrations in the boiler water and the feed-water. The concentration degree can be determined from the following Eq. 10 by employing the dissolved substance concentrations in the boiler water and the feed-water. Alternatively, the concentration degree may be determined by measuring respective volume of the feed-water and blowdown, and employing the following Eq. 11.

$$\text{Concentration degree}=\text{dissolved substance concentration in boiler water}/\text{dissolved substance concentration in feed-water} \quad \text{(Eq. 10)}$$

$$\text{Concentration degree}=\text{feed-water volume}/\text{blowdown volume} \quad \text{(Eq. 11)}$$

Thus, the chemical concentration of the boiler water can be more reliably controlled to fall within the target range by applying, to the controller 12, information representing the concentration degree in the objective boiler, and determining the target injection amount.

In the case where the electrical conductivity meter is incorporated in a boiler body as described above, if a measured value of the electrical conductivity meter exceeds a predetermined upper limit value (or, when there is an upper limit value for blow control, a value that is set to be higher than the predetermined upper limit value separately therefrom), the target injection amount may be reduced for a certain period until the measured value of the electrical conductivity meter becomes lower than the predetermined upper limit value. As a result, the occurrence of carryover can be prevented.

Figure 8:
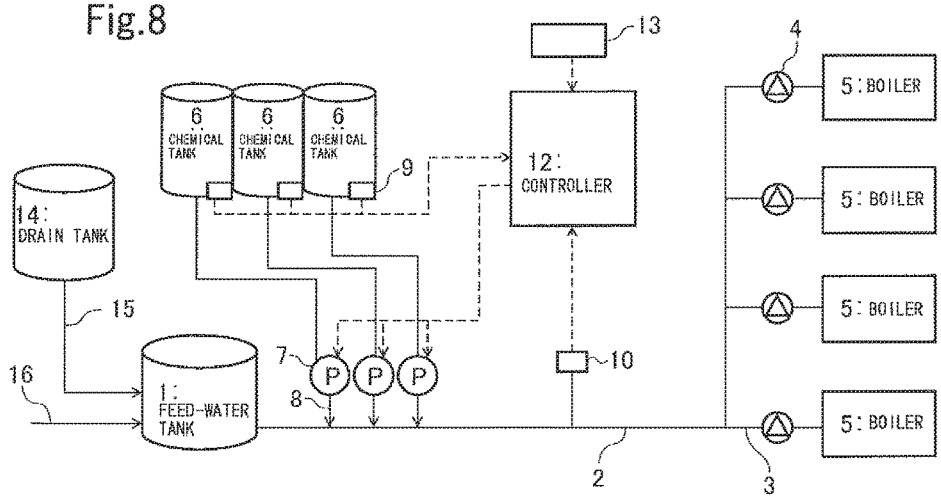
FIG. 8 is a block diagram of a boiler feed-water facility according to a modification.

When the drain is recovered, or when the quality of the raw water varies to a large extent, balance among required amounts of individual chemical components may greatly change for the reason that the required amount of one of the individual chemical components increases and the required amount of another one decreases. In such a situation, water treatment can be performed economically by controlling the individual chemical components separately. In the above case, as illustrated in FIG. 8, the chemical tank 6 and the chemical injection pump 7 are prepared for each of the chemical components, and information regarding a chemical liquid amount for each chemical tank 6 is input to the controller 12. The controller 12 determines a chemical reduction amount for each chemical component and controls the discharge rate of the corresponding chemical injection pump 7.

The controller 12 is able to obtain information regarding at least one of the feed-water temperature, the quality of the feed-water, the drain recovery rate, and the boiler concentration degree, and to change the target injection amount for each chemical tank 6 in accordance with the obtained information in a way depending on the quality of the feed-water, or a way of holding constant the chemical concentration of the feed-water, or a way of holding constant the chemical concentration of the boiler water. In the configuration illustrated in FIG. 8, there are no limitations on the number and the type of the chemical tanks 6.

EXAMPLES of the third and fourth inventions and COMPARATIVE EXAMPLES will be described below. In these Examples and COMPARATIVE EXAMPLES, the chemical liquid was prepared as a solution in which were dissolved potassium hydroxide (5% product) as a pH adjuster, hydrazine monohydrate (20% product) as a deoxidizer, and polyacrylic acid with molecular weight of 4000 as a scale preventive.

EXAMPLE 2-1

In accordance with the chemical injection control method of the present invention, the chemical liquid was injected into the feed-water main pipe 2 in the boiler feed-water facility, illustrated in FIG. 7, where two experimental boilers (maximum evaporation of 500 kg/h), each simulating a small once-through boiler, are equipped as the boilers 5. A chemical injection point was set to a position away from an outlet of the feed-water tank through a distance of 500 mm. The chemical liquid was injected in a state that the injection nozzle 8 made of SUS and having an inner diameter of 6 mm and an outer diameter of 8 mm was inserted to a center of the feed-water main pipe 2 with a pipe diameter 40A.

The Dailite Tank (N type) of 50 L made by DAILITE CO., LTD. was used as the chemical tank 6. A lower portion of the tank was worked into a state enabling a chemical liquid amount sensor to be screwed into the tank.

KV-1000 made by KEYENCE CORPORATION was used as the controller 12, KV-40DA was used as the input unit, and KV-40AD was used as the output unit. EHN-B11VC1YN made by IWAKI CO., LTD. was used as the chemical injection pump 7, the clamp-on ultrasonic flowmeter UL330 made by TOKYO KEISO CO., LTD. was used as the flowmeter 10, and HT1-02OKP-02-V made by SENSEZ Corporation was used as the chemical liquid amount sensor (pressure sensor) 9.

The flowmeter 10 detects the integrated flow rate by employing a pulse signal of 1 pulse/0.1 L, and detects the instantaneous flow rate by employing analog signals of 4 to 20 mA corresponding to 0 to 3500 L/h. The pressure ranging from 0 to 20 kPa, detected by the pressure sensor 9, was input as a signal of 4 to 20 mA to the controller 12. The injection amount was adjusted with the chemical injection pump 7 by controlling the number of strokes per minute with signals of 4 to 20 mA corresponding to 0 to 38 mL/min.

The boiler 5 was operated in a high-combustion fixed mode. The feed-water amount was 400 L/h per boiler, and the performance of the feed-water pump 4 was 1350 L/h.

Figure 9:
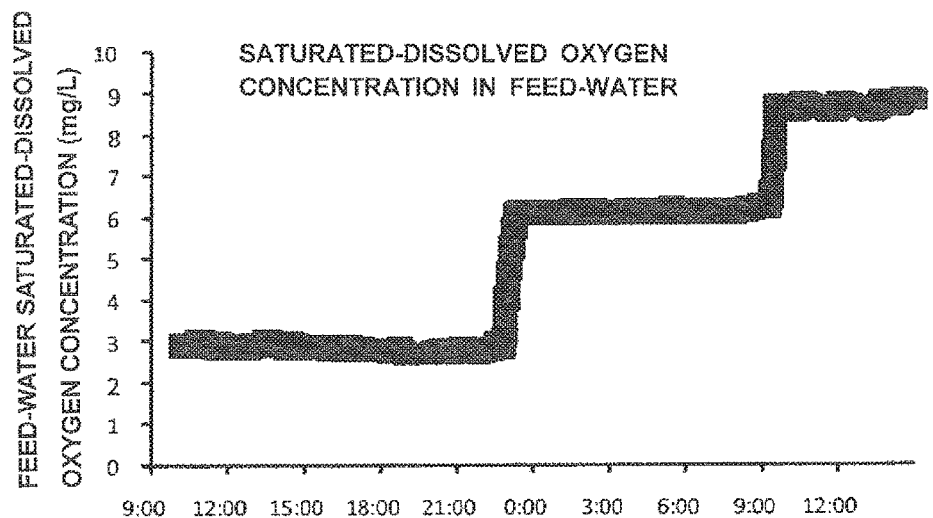
FIG. 9 is a graph depicting a saturated-dissolved oxygen concentration in feed-water in EXAMPLE 2-1.

The operation was performed while the temperature of the feed-water tank 1 was changed to 20, 40 and 80° C. at intervals of several hours. The feed-water temperature was measured by E52-CA10AE-N (K thermocouple) made by OMRON Corporation, which was attached to the surface of the feed-water main pipe 2 near the outlet of the feed-water tank and was covered with a lagging material. A saturated-dissolved oxygen concentration was measured from an average feed-water temperature at intervals of 10 min, and the target injection amount was calculated by employing the following Eq. 12. FIG. 9 depicts change of the saturated-dissolved oxygen concentration in the feed-water. Hydrazine monohydrate of 10% was contained as a deoxidization component in the chemical liquid used here. An amount of oxygen removed by the chemical liquid of 1 mg/L was 0.065 mg/L.

Target injection amount (mg/L)=[saturated-dissolved oxygen concentration (mg/L) at feed-water temperature]/0.065     (Eq. 12)

Figure 10:
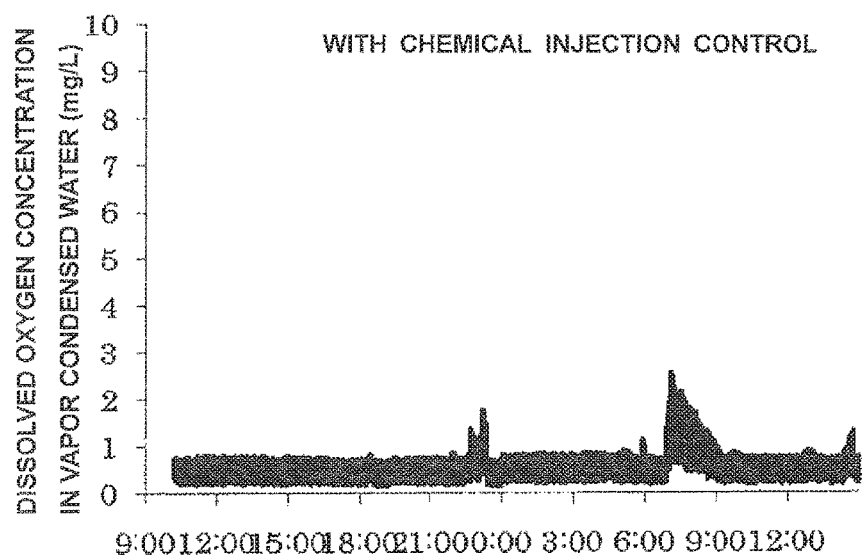
FIG. 10 is a graph depicting a dissolved oxygen concentration in vapor condensed water in EXAMPLE 2-1.

The chemical injection was performed under condition of changing the number of strokes per minute of the chemical injection pump 7 in proportion to the target injection amount. Vapor from the boiler 5 was cooled by a heat exchanger 18. The dissolved oxygen concentration in vapor condensed water was measured by a dissolved oxygen (DO) meter 19. A measured result was logged by a data logger 20 at intervals of 20 sec. FIG. 10 depicts the measured results. Furthermore, Table 4 indicates, by way of example, respective values of the feed-water temperature, the saturated-dissolved oxygen concentration, the dissolved oxygen concentration in the vapor condensed water, and the injection amount.

COMPARATIVE EXAMPLE 2-1

Figure 11:
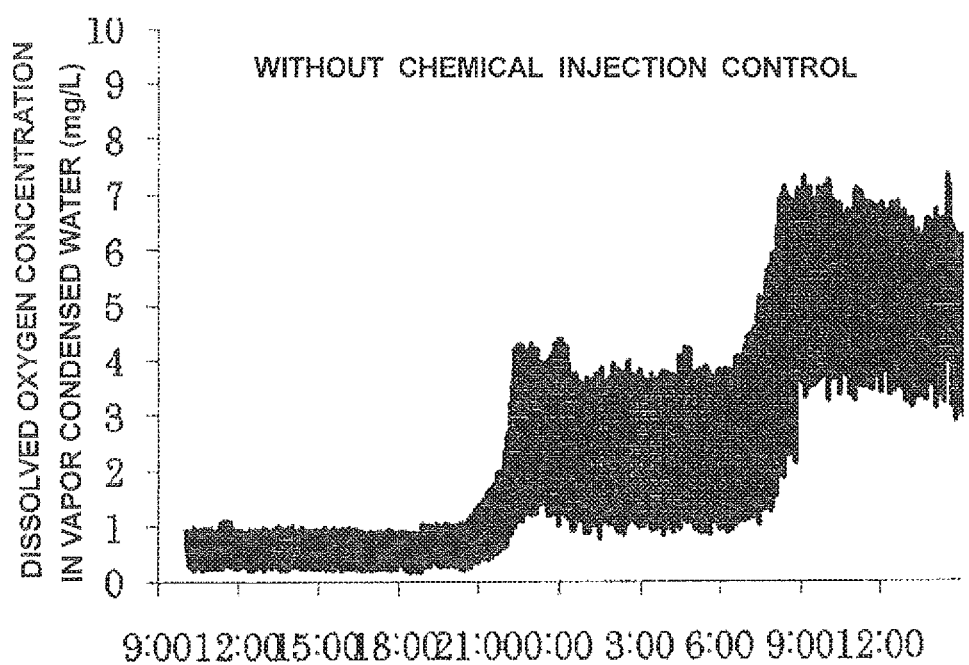
FIG. 11 is a graph depicting a dissolved oxygen concentration in vapor condensed water in COMPARATIVE EXAMPLE 2-1.

The same conditions as those in EXAMPLE 2-1 were set except for injecting the chemical liquid into the feed-water at a constant injection amount of 70 mg/L (estimated dissolved oxygen removal amount of 4.55 mg/L). FIG. 11 depicts the results obtained by logging, at intervals of 20 sec, the dissolved oxygen concentration in the vapor condensed water that was obtained by cooling boiler vapor through the heat exchanger 18. Furthermore, Table 4 indicates, by way of example, values of the dissolved oxygen concentration in the vapor condensed water.

TABLE 4

| | Saturated-Dissolved | EXAMPLE 2-1: With chemical injection control | | COMPARATIVE EXAMPLE 2-1: Without chemical injection control | |
|---|---|---|---|---|---|
| Feed-Water Temperature (° C.) | Oxygen Concentration in Feed-Water (mg/L) | Injection Amount (mg/L) | Dissolved Oxygen Concentration in Vapor Condensed Water (mg/L) | Injection Amount (mg/L) | Dissolved Oxygen Concentration in Vapor Condensed Water (mg/L) |
| 76.4 | 3.3 | 51 | 0.5 | 70 | 0.71 |
| 41.7 | 6.2 | 95 | 0.66 | 70 | 2.69 |
| 21.5 | 8.7 | 134 | 0.54 | 70 | 5.31 |

In EXAMPLE 2-1, the dissolved oxygen concentration in the vapor condensed water could be maintained low by increasing the number of strokes per minute of the chemical injection pump 7 depending on the saturated-dissolved oxygen concentration at the average feed-water temperature measured at intervals of 10 min. Because of the feedback control, the dissolved oxygen concentration in the vapor temporarily increased at each boundary in change of the feed-water temperature, but the dissolved oxygen concentration was settled to a level of 1 mg/L or less.

On the other hand, the injection amount was constant in COMPARATIVE EXAMPLE 2-1. At the feed-water temperatures of 20° C. and 40° C., the dissolved oxygen concentration in the feed-water was higher than the deoxidization capability generated by the chemical, and the concentration of dissolved oxygen transiting to the vapor was relatively high.

As described above, the water treatment effect was effectively developed by changing the target injection amount depending on the feed-water temperature without injecting the chemical in excess.

EXAMPLE 2-2

Figure 12:
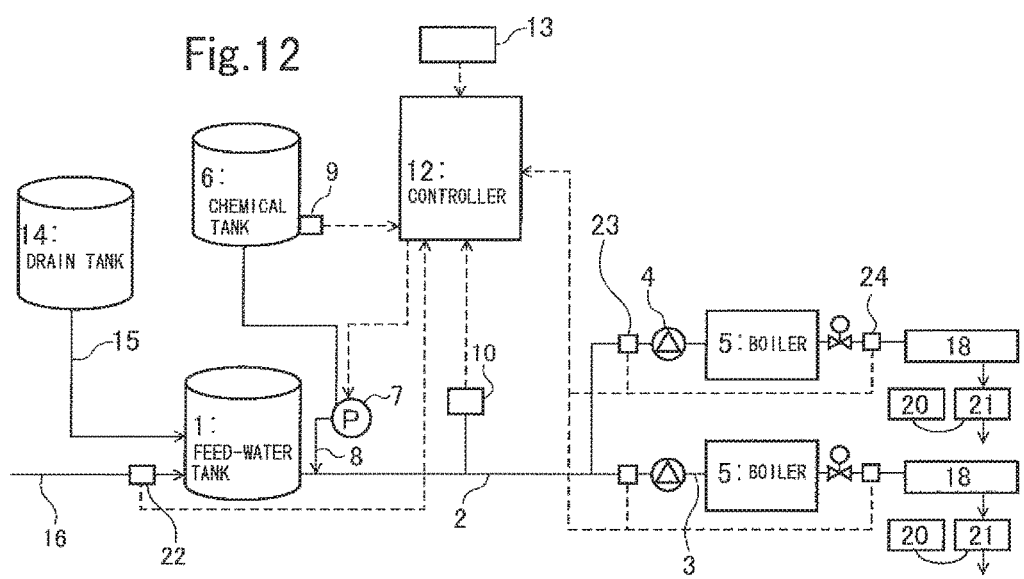
FIG. 12 is a block diagram of a boiler feed-water facility used in EXAMPLE 2-2.
Figure 13:
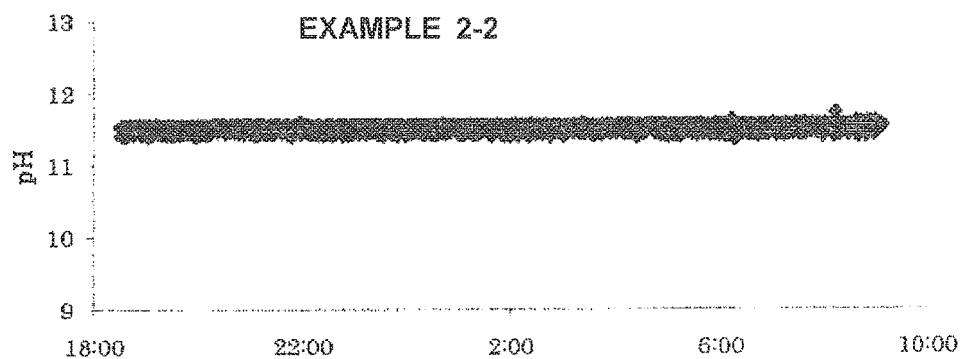
FIG. 13 is a graph depicting pH of vapor condensed water in EXAMPLE 2-2.

In a boiler feed-water facility illustrated in FIG. 12, the chemical injection was performed such that an acid consumption (pH 8.3) was held at 250 (mg-$CaCO_3$/L) with a pH target value of boiler water set to 11.5 taking into account the concentration degree obtained from values of feed-water flowmeters 23 and blow flowmeters 24 installed respectively for individual boilers. The boiler water was continuously taken out from the boiler 5 at a rate of 200 ml/min, and was cooled by the heat exchanger 18. A pH value of vapor condensed water was measured by a pH meter 21, and the measured value was logged by a data logger 20 at intervals of 1 min. FIG. 13 shows the measured results.

The drain recovery rate was determined from results measured by a flowmeter 22 (Flowpet EG made by OVAL Corp.) installed in a make-up water line 16, and by the above-mentioned flowmeter 10. One experimental boiler (maximum evaporation of 500 kg/h) simulating a small once-through boiler was operated in the high-combustion mode. Continuous blow of the boiler 5 was set on the basis of a value of an electrical conductivity meter associated with the boiler such that an upper limit was 300 mS/m and a lower limit was 250 mS/m. Vapor pressure was 0.7 MPa. The required injection amount was determined by employing the following Eq. 13. An acid consumption (pH 8.3) attributable to the used chemicals was 4.5 (mg-$CaCO_3$/L) per 100 mg/L.

Required alkali component amount $$\text{(acid consumption (pH 4.8))} \qquad \text{(Eq. 13)}$$
$$(mg - CaCO_3/L) = [P1/N] - [P2 \times 0.5 \times (1+\alpha) \times (1-r)] =$$
$$[250/(\text{feed-water volume})/(\text{blowdown volume})] -$$
$$[30 \times 0.5 \times (1+0.4) \times$$
$$[1 - \{(\text{feed-water volume}) - (\text{make-up water volume})\}/(\text{feed-water volume})]]$$

P1: target boiler-water acid consumption (pH 8.3) (mg-$CaCO_3$/L)=250 (mg-$CaCO_3$/L)
P2: make-up water acid consumption (pH 4.8) (mg-$CaCO_3$/L)=30 (mg-$CaCO_3$/L)
N: concentration degree=(feed-water volume)/(blowdown volume)
α: coefficient depending on pressure
α=0.4 at boiler pressure 0.7 MPa
r: drain recovery rate={(feed-water volume)−(make-up water volume)}/(feed-water volume)

COMPARATIVE EXAMPLE 2-2

Figure 14:
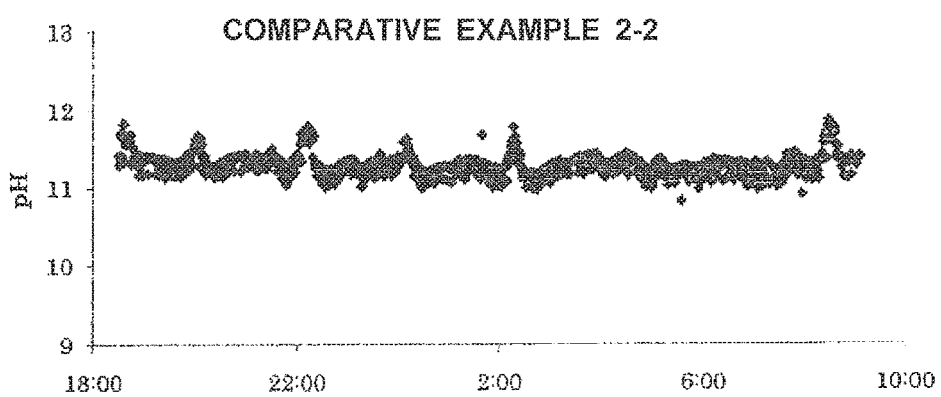
FIG. 14 is a graph depicting pH of vapor condensed water in COMPARATIVE EXAMPLE 2-2.

In the same boiler feed-water facility as that used in EXAMPLE 2-2, chemical injection was constantly performed such that the chemical concentration in the feed-water was held at 100 mg/L. A part of the boiler water was continuously taken out from the boiler 5 at a rate of 200 ml/min, and was cooled by the heat exchanger 18. A measured pH value of condensed water was logged at intervals of 1 min. FIG. 14 shows the measured results.

COMPARATIVE EXAMPLE 2-3

Figure 15:
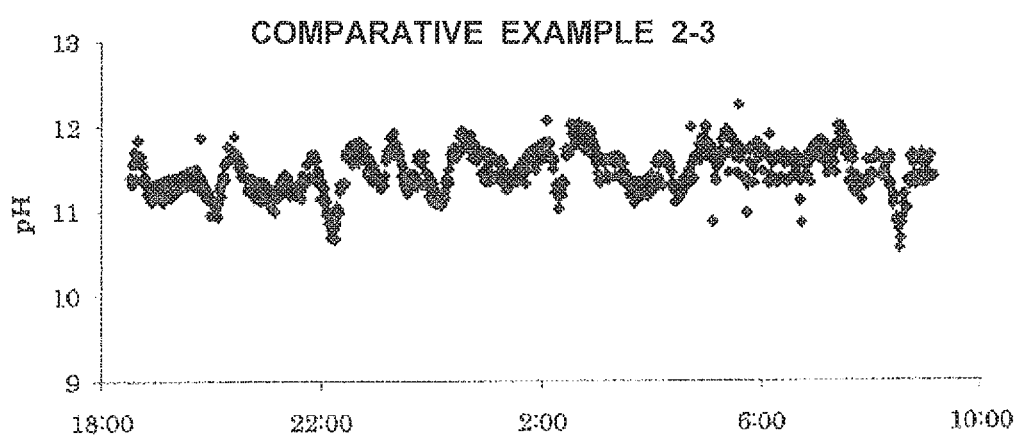
FIG. 15 is a graph depicting pH of vapor condensed water in COMPARATIVE EXAMPLE 2-3.

In the same boiler feed-water facility as that used in EXAMPLE 2-2, a part of the boiler water was continuously taken out from the boiler 5 at a rate of 200 ml/min such that the feed-water acid consumption (pH 8.3) was held constant. The boiler water was cooled by the heat exchanger 18, and a measured pH value of condensed water was logged at intervals of 1 min. FIG. 15 shows the measured results.

The chemical injection was performed such that the acid consumption (pH 8.3) in the feed-water was held at 34.5 mg-$CaCO_3$/L. The required injection amount was determined by employing the following Eq. 14.

$$\text{Required injection amount} = \qquad \text{(Eq. 14)}$$
$$34.5 - [\text{acid consumption (pH 8.3) generated by feed} -$$
$$\text{water acid consumption (pH 4.8)}] =$$
$$34.5 - [P2 \times 0.5 \times (1+\alpha) \times (1-r)] =$$
$$34.5 - [30 \times 0.5 \times (1+0.4) \times$$
$$[1 - \{(\text{feed-water volume}) - (\text{make-up water volume})\}/(\text{feed-water volume})]]$$

P1: target boiler-water acid consumption (pH 8.3) (mg-$CaCO_3$/L)=250 (mg-$CaCO_3$/L)
P2: make-up water acid consumption (pH 4.8) (mg-$CaCO_3$/L)=30 (mg-$CaCO_3$/L)
α: coefficient depending on pressure α=0.4 at boiler pressure 0.7 MPa
r: drain recovery rate={(feed-water volume)−(make-up water volume)}/(feed-water volume)

It was confirmed that, in EXAMPLE 2-2, pH was more stable than in COMPARATIVE EXAMPLE 2-2 and COMPARATIVE EXAMPLE 2-3. This was because the chemical injection was performed so as to hold the boiler-water acid consumption (pH 8.3) within a certain range in consideration of influences of the drain recovery and the concentration degree.

In COMPARATIVE EXAMPLE 2-2, the chemical injection was performed such that the chemical concentration in the feed-water was held constant without considering the drain recovery and the concentration degree. In COMPARATIVE EXAMPLE 2-3, the chemical injection was performed such that the feed-water acid consumption was held constant in consideration of the influence of the drain recovery. Comparing COMPARATIVE EXAMPLE 2-2 and COMPARATIVE EXAMPLE 2-3, variations of the pH value were larger in COMPARATIVE EXAMPLE 2-3. In a boiler in which the concentration degree is controlled on the basis of the electrical conductivity of the feed-water, the concentration degree reduces when the drain recovery rate decreases and the electrical conductivity of the make-up water increases. On the other hand, the concentration degree increases when the drain recovery rate increases and the electrical conductivity of the make-up water decreases. Accordingly, it can be said that a certain level of buffer function exists with respect to the acid consumption (pH 8.3). For that reason, a variation width of pH in the boiler water is smaller in COMPARATIVE EXAMPLE 2-2 than in COMPARATIVE EXAMPLE 2-3. However, the pH variations cannot be absorbed with only the function obtained in COMPARATIVE EXAMPLE 2-2. In other words, effectivity of EXAMPLE 2-2 was confirmed.

EXAMPLE 2-3

In the same boiler feed-water facility as that used in EXAMPLE 2-1, the proportionality coefficient of the target injection amount, i.e., the proportionality coefficients of the discharge rate of the chemical injection pump and the feed-water instantaneous flow rate, was changed in accordance with a 20-min average value of the saturated-dissolved oxygen concentration depending on the feed-water temperature. Moreover, for each period corresponding to a feed-water flow amount of 100 m$^3$, a chemical liquid reduction amount and an estimated value of the accumulated chemical liquid reduction amount during the relevant period were compared with each other in the controller 12. When the chemical liquid reduction amount was not within ±10% of the estimated value of the accumulated chemical liquid reduction amount, the proportionality coefficient was changed in accordance with the difference between the estimated value of the accumulated chemical liquid reduction amount and the (actual calculated) chemical liquid reduction amount. However, after checking the injection amount (or the chemical reduction amount) at the third time, the stroke length of the chemical injection pump 7 was changed from 100% to 30% in estimation of a fall in the performance of the chemical injection pump 7.

Figure 16A:
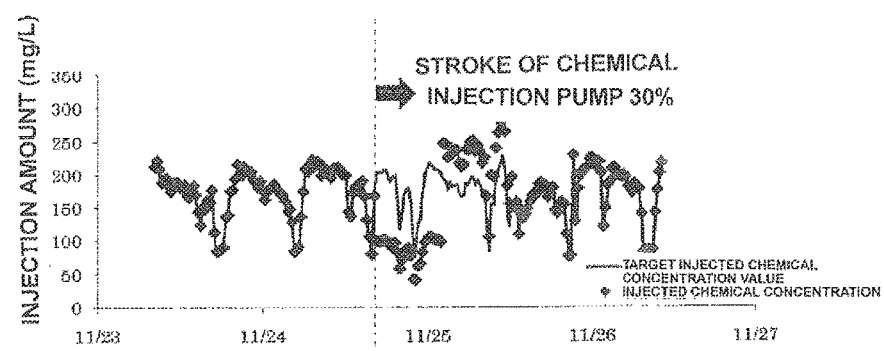
FIG. 16a is a graph illustrating an injection amount in EXAMPLE 2-3.

The feed-water temperature varied from 15° C. to 85° C. due to the drain recovery. A solid line in FIG. 16a depicts the result of calculating the target injected chemical concentration from the following Eq. 15 by employing the saturated-dissolved oxygen concentration at the feed-water temperature. Hydrazine monohydrate of 10% was contained as a deoxidization component in the chemical liquid used here, and an amount of oxygen removed by the chemical liquid of 1 mg/L was 0.065 mg/L. A value of 1.5 was multiplied as the safety coefficient.

Required injection amount (mg/L)=(saturated-dissolved oxygen concentration (mg/L) at feed-water temperature)/0.065×1.5  (Eq. 15)

Figure 16B:
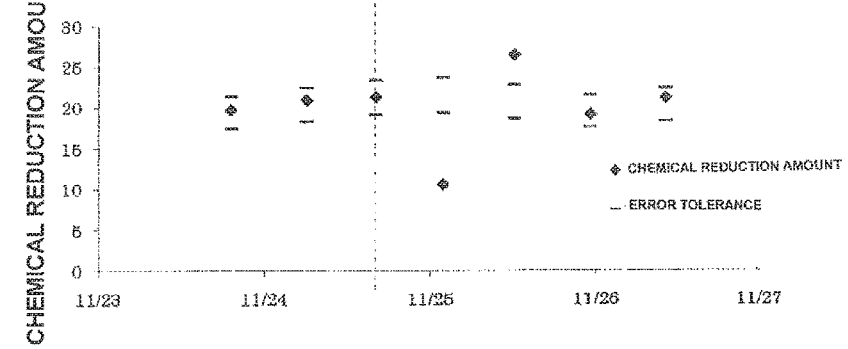
FIG. 16b is a graph illustrating a chemical reduction amount.

The actual injected chemical concentration at intervals of 20 min was plotted in FIG. 16a. The actual injected chemical concentration was determined from both the difference between the estimated chemical reduction amount and the measured chemical reduction amount and the difference between the instantaneous feed-water flow rate and the delivery performance of the chemical injection pump, those differences being checked for each feed-water volume of 100 m$^3$. FIG. 16b plots the chemical reduction amount in the chemical tank 6 for each feed-water volume of 100 m$^3$ and an error range of the estimated chemical reduction amount.

As seen from FIG. 16b, since, after checking the injection amount at the third time, the stroke length of the chemical injection pump 7 was changed from 100% to 30%, the injection amount was reduced temporarily. However, through automatic adjustment of the discharge rate of the chemical injection pump when the injection amount was checked at the fourth time and the fifth time, the predetermined injected chemical concentration could be restored again when the injection amount was checked at the sixth time. In other words, with the feature of changing the target injected chemical concentration for each comparatively short period, even if the target injected chemical concentration range cannot be maintained due to, e.g., reduction in the performance of the chemical injection pump 7 or the feed-water pump 4 when the discharge rate of the chemical injection pump is changed to automatically adjust the injected chemical concentration depending on variations in the drain recovery and the quality of the feed-water, the water treatment control can be performed in such a way that the water treatment effect can be developed economically and maximally without resorting to manual efforts.

While the present invention has been described in detail in connection with the particular embodiments, it is apparent to those skilled in the art that the present invention can be variously modified without departing from the intent and the scope of the present invention.

This application is based on Japanese Patent Application No. 2014-038865, filed on Feb. 28, 2014, and Japanese Patent Application No. 2014-109277, filed on May 27, 2014, the entire contents of which are incorporated herein by reference.

The invention claimed is:

1. A device for controlling chemical injection into a boiler, the device comprising:
    a feed-water line for supplying feed-water from a feed-water tank to a boiler through a feed-water pipe provided with a feed-water pump;
    a feed-water flow rate measuring device for measuring a flow rate of the feed-water flowing through the feed-water pipe;
    a chemical injection pump for injecting a chemical liquid containing one or more chemicals for boiler water treatment into the feed-water line, the chemical liquid being stored in a chemical tank;
    a chemical liquid amount measuring device for measuring an amount of the chemical liquid stored in the chemical tank; and
    a controller for controlling a discharge rate of the chemical injection pump in proportion to the flow rate measured by the feed-water flow rate measuring device,
    wherein an average chemical concentration in the feed-water is calculated from a feed-water volume per a predetermined period and a reduction amount of the chemical liquid in the chemical tank per the predetermined period, the feed-water volume per the predetermined period being determined by the feed-water flow rate measuring device and the reduction amount of the chemical liquid in the chemical tank being determined by the chemical liquid amount measuring device,
    the controller controls the chemical injection pump to operate at a target discharge rate, the target discharge rate being resulted from multiplying the flow rate measured by the feed-water flow rate measuring device by a proportionality coefficient, in accordance with a preset target chemical concentration in the feed-water and the calculated average chemical concentration such that the average chemical concentration is held within a target chemical concentration range,
    the controller corrects the proportionality coefficient in accordance with a difference between the preset target chemical concentration in the feed-water and the calculated average chemical concentration,
    when the average chemical concentration in the feed-water is lower than a lower limit value of the target chemical concentration range, the proportionality coefficient is corrected to increase by multiplying the proportionality coefficient by a correction coefficient that corresponds to a difference between the lower limit value and the average chemical concentration, and
    when the average chemical concentration in the feed-water is higher than an upper limit value of the target chemical concentration range, the proportionality coefficient is corrected to decrease by multiplying the proportionality coefficient by a correction coefficient that corresponds to a difference between the higher limit value and the average chemical concentration.

2. A method for controlling chemical injection into a boiler, comprising:

supplying feed-water from a feed-water tank to a boiler through a feed-water pipe provided with a feed-water pump;

measuring a flow rate of the feed-water flowing through the feed-water pipe;

injecting a chemical liquid stored in a chemical tank into a feed-water line;

measuring an amount of the chemical liquid stored in the chemical tank;

calculating an average chemical concentration in the feed-water from a feed-water amount per predetermined period and a reduction amount of the chemical liquid in the chemical tank per the predetermined period, the feed-water amount per predetermined period being determined by a feed-water flow rate measuring device, the reduction amount of the chemical liquid in the chemical tank per the predetermined period being determined by a chemical liquid amount measuring device;

controlling a chemical injection pump to operate at a target discharge rate, the target discharge rate being resulted from multiplying the flow rate by a proportionality coefficient in accordance with a preset target chemical concentration in the feed-water and the calculated average chemical concentration such that the average chemical concentration is held within a target chemical concentration range; and correcting the proportionality coefficient in accordance with a difference between the preset target chemical concentration in the feed-water and the average chemical concentration calculated, wherein, when the average chemical concentration in the feed-water is lower than a lower limit value of the target chemical concentration range, the proportionality coefficient is corrected to increase by multiplying the proportionality coefficient by a correction coefficient that corresponds to a difference between the lower limit value and the average chemical concentration, and when the average chemical concentration in the feed-water is higher than an upper limit value of the target chemical concentration range, the proportionality coefficient is corrected to decrease by multiplying the proportionality coefficient by a correction coefficient that corresponds to a difference between the higher limit value and the average chemical concentration.

\* \* \* \* \*